United States Patent
Rachakonda et al.

(10) Patent No.: US 12,271,250 B2
(45) Date of Patent: *Apr. 8, 2025

(54) ELECTRONIC DISPLAY PIPELINE POWER MANAGEMENT SYSTEMS AND METHODS

(71) Applicant: Apple Inc., Cupertino, CA (US)

(72) Inventors: Ramana V. Rachakonda, Austin, TX (US); Peter F. Holland, Los Gatos, CA (US); Rohit K. Gupta, Santa Clara, CA (US); Brad W. Simeral, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/949,834

(22) Filed: Sep. 21, 2022

(65) Prior Publication Data

US 2023/0014545 A1    Jan. 19, 2023

Related U.S. Application Data

(63) Continuation of application No. 17/111,294, filed on Dec. 3, 2020, now Pat. No. 11,614,791.

(Continued)

(51) Int. Cl.
*G06F 1/3234* (2019.01)
*G06F 1/18* (2006.01)
(Continued)

(52) U.S. Cl.
CPC ............ *G06F 1/3265* (2013.01); *G06F 1/189* (2013.01); *G06F 1/3218* (2013.01); *G09G 3/20* (2013.01);
(Continued)

(58) Field of Classification Search
CPC ...... G06F 1/3265; G06F 1/189; G06F 1/3218; G06F 1/3228; G09G 3/20;
(Continued)

(56) References Cited

U.S. PATENT DOCUMENTS

| | | |
|---|---|---|
| 8,458,429 B2 | 6/2013 | Dahan et al. |
| 8,766,919 B1 | 7/2014 | Lachwani et al. |

(Continued)

FOREIGN PATENT DOCUMENTS

| | | | |
|---|---|---|---|
| WO | WO 2020/168949 | * | 8/2020 |
| WO | WO 2020168949 A1 | * | 8/2020 |

OTHER PUBLICATIONS

PCT International Search Report and Written Opinion for PCT Application No. PCT/US2021/039213 mailed Oct. 13, 2021, 13 pages.

(Continued)

*Primary Examiner* — Md Saiful A Siddiqui
(74) *Attorney, Agent, or Firm* — Fletcher Yoder, P.C.

(57) ABSTRACT

An electronic device may include a display panel. When content of an image frame is expected to consume relatively higher amounts of power, a controller of the electronic device may operate a switch to change a power supply of the display panel to be a power management integrated circuit of the electronic device. However, when content of an image frame is expected to consume relatively less amounts of power, the controller may operate the switch to change the power supply of the display panel to be a power supply of an electronic display, such as a power supply used to power driver circuitry of the electronic display.

20 Claims, 13 Drawing Sheets

Related U.S. Application Data

(60) Provisional application No. 63/078,875, filed on Sep. 15, 2020.

(51) Int. Cl.
*G06F 1/3218* (2019.01)
*G09G 3/20* (2006.01)

(52) U.S. Cl.
CPC . *G09G 2320/103* (2013.01); *G09G 2330/021* (2013.01); *G09G 2330/026* (2013.01); *G09G 2380/14* (2013.01)

(58) Field of Classification Search
CPC ....... G09G 2320/103; G09G 2330/021; G09G 2330/026; G09G 2380/14
See application file for complete search history.

(56) References Cited

U.S. PATENT DOCUMENTS

| | | | |
|---|---|---|---|
| 8,862,906 B2 | 10/2014 | Jeganathan et al. | |
| 9,323,307 B2 | 4/2016 | Haj-Yihia | |
| 9,620,088 B2 | 4/2017 | Bibikar et al. | |
| 9,625,987 B1* | 4/2017 | LaPenna | G06F 1/3265 |
| 9,684,360 B2 | 6/2017 | Kupermann et al. | |
| 2011/0175878 A1* | 7/2011 | Hsiao | G09G 3/3677 |
| | | | 345/211 |
| 2012/0044273 A1* | 2/2012 | Park | G09G 3/3208 |
| | | | 345/211 |
| 2014/0002739 A1 | 1/2014 | Kwa et al. | |
| 2014/0344608 A1 | 11/2014 | Wang | |
| 2015/0187339 A1 | 7/2015 | Waddington | |
| 2015/0309550 A1* | 10/2015 | Shirakami | G09G 3/3696 |
| | | | 713/300 |
| 2015/0362980 A1 | 12/2015 | Tripathi | |
| 2016/0071485 A1 | 3/2016 | Tripathi et al. | |
| 2016/0189608 A1* | 6/2016 | Park | G09G 3/3275 |
| | | | 345/82 |
| 2017/0085253 A1 | 3/2017 | Cao et al. | |
| 2017/0092236 A1 | 3/2017 | Tripathi et al. | |
| 2017/0220131 A1 | 8/2017 | Huang et al. | |
| 2018/0061355 A1 | 3/2018 | Zheng et al. | |
| 2018/0366057 A1 | 12/2018 | Shen et al. | |
| 2019/0286222 A1 | 9/2019 | An et al. | |
| 2020/0081517 A1 | 3/2020 | Holland et al. | |
| 2021/0335285 A1* | 10/2021 | Liu | H02J 7/35 |
| 2021/0407456 A1* | 12/2021 | Hussain | G09G 5/363 |
| 2022/0075440 A1 | 3/2022 | Rachakonda et al. | |

OTHER PUBLICATIONS

PCT International Search Report and Written Opinion for PCT Application No. PCT/US2021/050107 mailed Dec. 21, 2021, 14 pages.

* cited by examiner

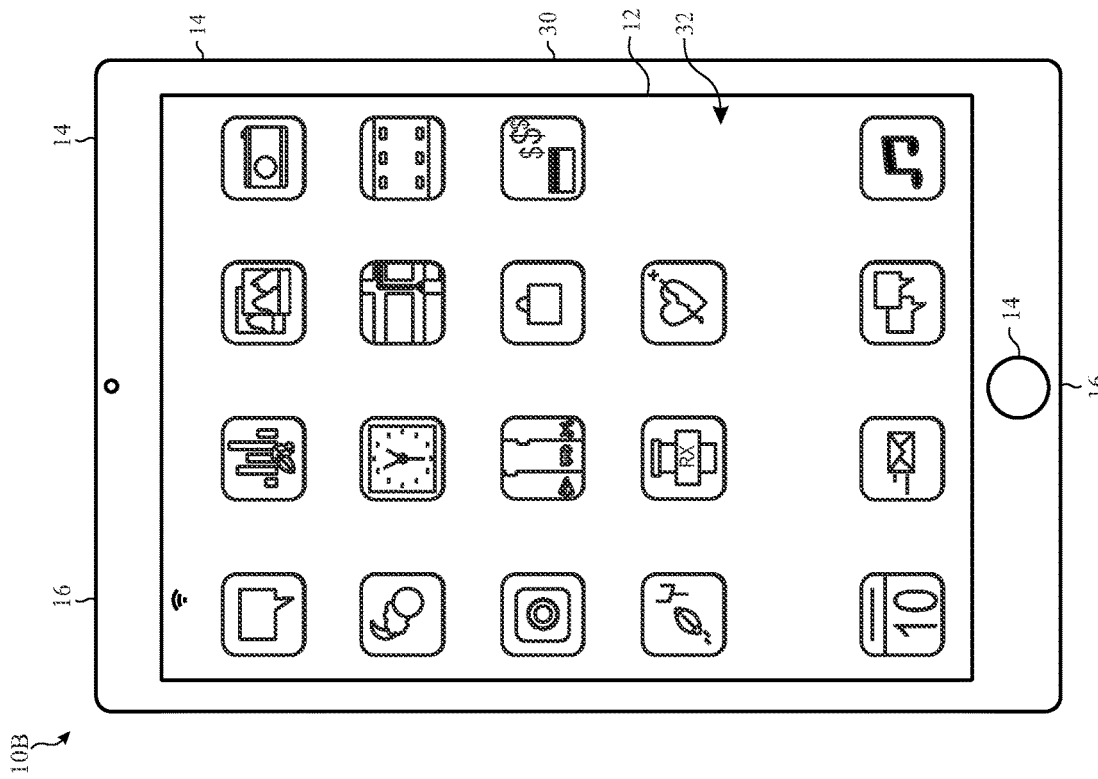
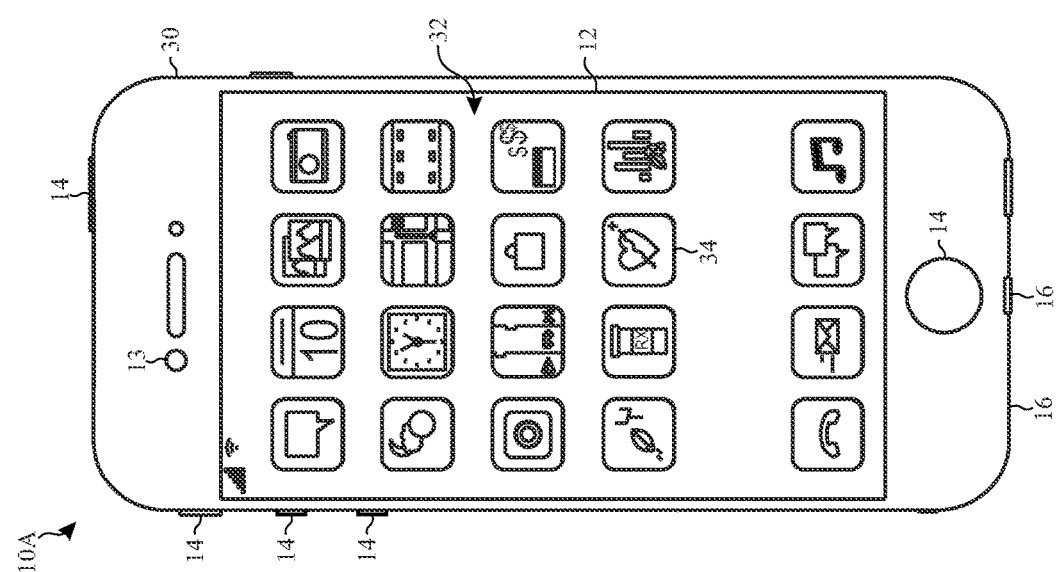

ELECTRONIC DISPLAY PIPELINE POWER MANAGEMENT SYSTEMS AND METHODS

CROSS REFERENCE TO RELATED APPLICATION

This application is a continuation of U.S. application Ser. No. 17/111,294, filed Dec. 3, 2020, entitled "ELECTRONIC DISPLAY PIPELINE POWER MANAGEMENT SYSTEMS AND METHODS," which is a non-provisional application claiming priority to U.S. Provisional Application No. 63/078,875, entitled "ELECTRONIC DISPLAY PIPELINE POWER MANAGEMENT SYSTEMS AND METHODS," filed Sep. 15, 2020, each of which is hereby incorporated by reference in its entirety for all purposes.

BACKGROUND

The present disclosure relates generally to electronic displays and, more particularly, to power management techniques for image data processing circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data.

In some instances, while an electronic device is powered-on, its electronic display may have the ability to be selectively powered on or powered off. When powered on (i.e., in a powered-on state), an electronic display may display images. However, an electronic display generally consumes more electrical power when powered on compared to when it is powered off (i.e., in a powered-off state). Thus, increasing the duration an electronic display is powered on may increase the amount of time a person can view images on the display, but doing so may consume more power. This may be of particular concern for wearable and/or portable electronic devices with batteries that store a finite amount of electrical energy.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic device may include a display pipeline that processes image data before the image data is displayed on electronic display to improve the perceived image quality of the electronic display. Image frames may be rendered and stored in memory accessible to the display pipeline by a processor of the electronic device.

To reduce power consumption, image frames may be pre-rendered by an image source that, in some cases, is able to be operated off when idle after pre-rendering image frames. By accessing the pre-rendered image frames, the display pipeline may continue to process the image data even while the processor is powered off. Thus, operation of the electronic display is unaffected by the image source being off since the display pipeline may continue to prepare image data for display.

In some cases, the display pipeline is operated in a reduced-power mode. For example, the display pipeline may be power-gated when idle between processing of image frames. When operating the display pipeline in the reduced power mode, an external controller may operate a switch to change a source of power for some components of the electronic display. The external controller may operate the switch between a first position to power the electronic display using power rail directly from a power management integrated circuit (PMIC) and a second position to power the electronic display using a display driver integrated circuit (DDIC) power rail. The DDIC power rail or the PMIC may supply power to components disposed within the electronic display. Using the PMIC to supply power to components of the electronic display may consume relatively high amounts of power, and reducing an amount of time that the PMIC is on may reduce overall power consumption of the electronic device. Thus, by alternating use of the DDIC power rail and the PMIC, the operation of the electronic device may be improved since less time overall may be spent with the PMIC powering the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 2 is an example of the electronic device of FIG. 1, in accordance with an embodiment;

FIG. 3 is another example of the electronic device of FIG. 1, in accordance with an embodiment;

DETAILED DESCRIPTION OF SPECIFIC EMBODIMENTS

Figure 1:
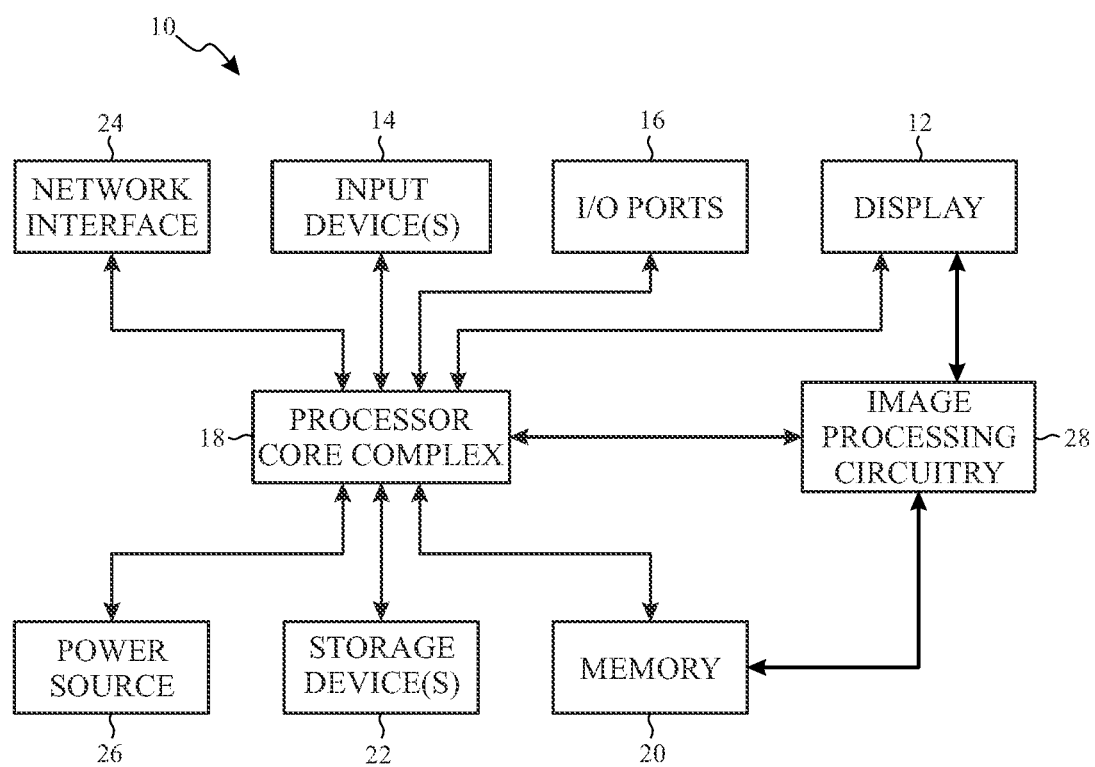
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

An electronic device may include components that consume electrical power. For example, electronic devices may include an image source that renders image frames by generating corresponding image data, which may be stored in memory. Some electronic devices may include a display pipeline that processes the image data before the image data is used to display the image frame on an electronic display. The display pipeline thus may improve the perceived image quality of the image frame.

Based at least in part on received image data, the electronic display may control light emission or luminance of its light-emitting or light-permitting components to display an image frame corresponding to the image data. For example, in a liquid crystal display (LCD), electrical energy may be stored in the pixel electrode of a display pixel to produce an electric field between the pixel electrode and a common electrode, which controls orientation of liquid crystals and, thus, permits various amounts of light emission from the display pixel. In an organic light-emitting diode (OLED) display, electrical energy may be stored in a storage capacitor of a display pixel to control electrical power (e.g., current, voltage) supplied to a self-emissive component (e.g., OLED), and thus, light emission from the display pixel. However, electronic devices, such as wearable or portable electronic devices, often store a finite amount of electrical energy.

Accordingly, the present disclosure provides techniques for implementing an electronic display that may continuously present images even while some components of the electronic device are not operating or are powered-off (e.g., partially powered-off). Indeed, the electronic device may include a processor that controls power management. The processor may determine to power-off and/or power-gate (e.g., reduce power) image processing circuitry of the electronic display when idle and/or while a user of the electronic device is not actively interacting with the electronic device. When image processing circuitry is in a reduced-power state, the processor may determine when to power-on the display pipeline and instruct the reconnection of electrical power. In this manner, power consumption may be reduced by permitting the display pipeline to be temporarily operated in a reduced-power state when the display pipeline is idle between processing of image frames for presentation.

Additional systems and methods may be used to improve operation of the electronic device. Indeed, the electronic device may use a power management integrated circuit (PMIC) that supplies power to a variety of components of the electronic device. This may include an electronic display. Using the PMIC, however, may consume a substantial amount of power and generally correspond to relatively low efficiency but high power output.

To save power, the electronic device may operate in a reduced power state while its image source is powered off or power gated and/or while its display pipeline is powered off or powered gated. Indeed, an external controller may determine when to operate the image processing circuitry and/or the image source in reduced power states, in a power-off state, and in a full power-on state. Independent of the power modes that the image processing circuitry, the image source, the electronic device may also operate in a reduced power state when a display panel of the electronic display is powered from a source other than the PMIC since, for example, the PMIC corresponds to relatively low efficiency but high power outputs. Indeed, the external controller may instruct switching circuitry (e.g., a switch, a multiplexer) to change a source of power for the display panel from the PMIC to a power supply used to power other components of the electronic display, such as a display driver integrated circuit (DDIC) power rail. The power supply used to power the DDIC may generally correspond to relatively high efficiency but low power outputs. The external controller of the electronic device may change which power supply is used to power the display panel based on any suitable factors, including an expected luminance or refresh rate of image content provided to the electronic display.

Content-based power supply selection may improve operation of the electronic device by reducing the amount of power consumed by the display panel and, thus, the electronic display. The PMIC may be used to power the display panel when processing circuitry (e.g., the external controller, display pipeline controller) determines that a relatively high amount of power is expected to be used by the display panel to present a next image frame or future image frames. High amounts of power may be used to render image data that has a relatively high brightness value, is of all white or relatively bright image colors, is to be presented with quick frequencies (e.g., greater than or equal to 60 hertz (Hz)), or the like. When the processing circuitry does not expect the display panel to use relatively high amounts of power (e.g., image frames to be presented at frequencies less than 60 Hz, image frames to be presented using lower display brightness values such as less than or equal to half of maximum display brightness value, image frames corresponding to relatively dark image colors, image data provided in a flip-book mode), the processing circuitry may cause the power supply for the DDIC to power the display panel. Since the PMIC may consume relatively high amounts of power, a reduction in power consumed by the PMIC by refraining from outputting power to the display panel may lead to dramatic improvements in power consumed by the electronic device.

To help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, such as display drivers like row drivers and/or column drivers. Each of the self-emissive pixel 82 may include any suitable light emitting element, such as an LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

The electronic device 10 may include the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. It is noted that the image processing circuitry 28 (e.g., a graphics processing unit) may be included in the processor core complex 18.

The processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

The local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The processor core complex 18 is also operably coupled to the network interface 24. The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a $4^{th}$ Generation (4G) or Long-Term Evolution (LTE) network (e.g., cellular network), or $5^{th}$ Generation (5G) or New Radio (NR) network.

The processor core complex 18 is also operably coupled to the power source 26. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter. The power source 26 may use distribution rails and/or additional smaller power sources within the electronic device 10 to aid in supplying power to the one or more components.

The processor core complex 18 is also operably coupled to the one or more I/O ports 16. The I/O ports 16 may enable the electronic device 10 to interface with other electronic devices. For example, when a portable storage device is connected, the I/O port 16 may enable the processor core complex 18 to communicate data with the portable storage device.

The electronic device 10 is also operably coupled to the one or more input devices 14. The input device 14 may enable user interaction with the electronic device 10 by receiving user inputs. Thus, an input device 14 may include a button, a keyboard, a mouse, a trackpad, and/or the like. The input device 14 may include touch-sensing components in the electronic display 12. The touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information based on image data corresponding to the visual representations of information. For example, the electronic display 12 may present graphics including a graphical user interface (GUI) of an operating system, an application interface, a still image, video content, or the like by displaying frames based at least in part on image data. The electronic display 12 is operably coupled to the processor core complex 18 and the image processing circuitry 28. The electronic display 12 may display frames based on image data generated by the processor core complex 18, the image processing circuitry 28, or the like. The electronic display 12 may display frames based at least in part on image data received via the network interface 24, an input device, and/or an I/O port 16.

The electronic device 10 may be any suitable electronic device. To help illustrate, one example of a suitable electronic device 10, specifically a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, toggle between vibrate and ring modes, or the like. The I/O ports 16 may be accessed through openings in the enclosure 30 and may include an audio jack to connect to external devices.

Figure 4:
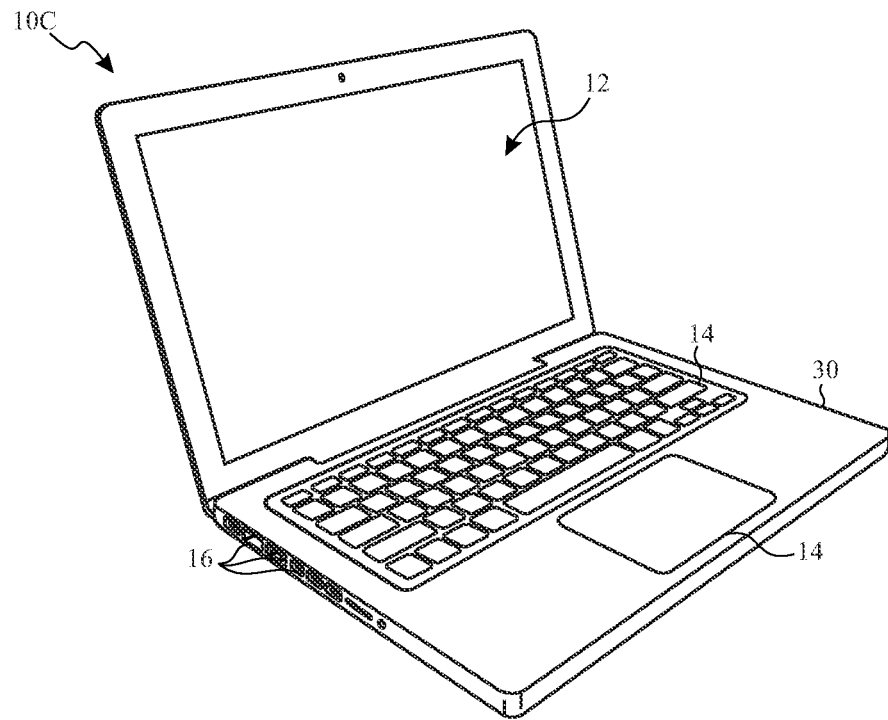
FIG. 4 is another example of the electronic device of FIG. 1, in accordance with an embodiment.
Figure 5:
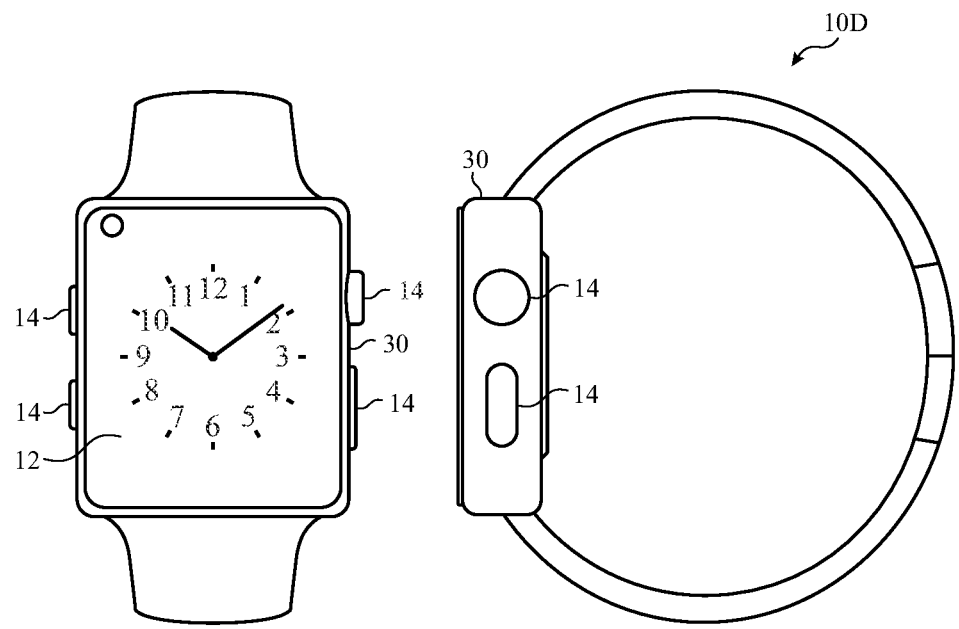
FIG. 5 is another example of the electronic device of FIG. 1, in accordance with an embodiment.

Another example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. The tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Operating an electronic device 10 to communicate information by displaying images on its electronic display 12 generally consumes electrical power. The electronic device 10 often store a finite amount of electrical energy. Thus, to reduce power consumption, an electronic device 10 may operate the electronic display 12 as an always-on display simultaneous to temporarily power-gating and/or powering-off other components, such as a display pipeline that processes image data before transmission to the electronic display 12.

Figure 6:
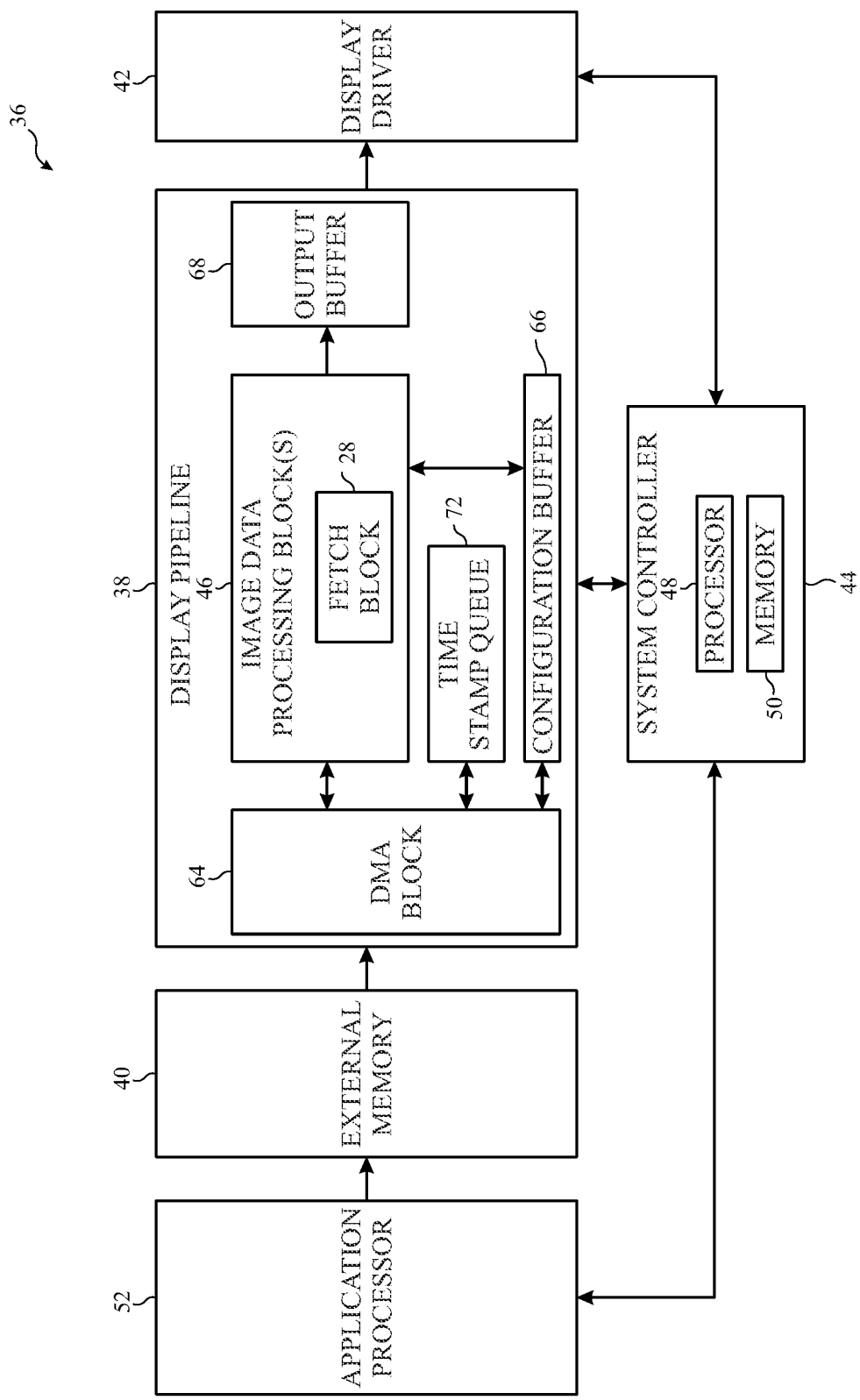
FIG. 6 is a block diagram of a portion of the electronic device of FIG. 1 including an application processor and a display pipeline, in accordance with an embodiment.

To help illustrate, an image processing system 36 that includes a display pipeline 38, which may be implemented in an electronic device 10, is shown in FIG. 6. The image processing system 36 also includes an application processor 52, external memory 40 (e.g., local memory 20), a system controller 44, and a display driver 42, which may be implemented in an electronic display 12. The system controller 44 may control operations of the display pipeline 38, the external memory 40, the display driver 42, and/or other portions of the electronic device 10. It is noted that the display pipeline 38 may include control circuitry, such as control circuitry similar to the system controller 44, as particularly illustrated in FIG. 11.

The system controller 44 may include a controller processor 48 and controller memory 50. The controller processor 48 may execute instructions stored in the controller memory 50 included in local memory 20, the main memory storage device 22, external memory 40, internal memory of a display pipeline 38, a separate tangible, non-transitory, computer readable medium, or any combination thereof. The controller processor 48 may be included in the processor core complex 18, the image processing circuitry 28, a timing controller in the electronic display 12, a separate processing module, or any combination thereof. Although depicted as a system controller 44, one or more separate system controllers 44 may be used to control operation of the electronic device 10.

The display pipeline 38 may operate to process image data to improve perceived image quality of a resulting image presented on the electronic display 12. The display pipeline 38 may receive image data from an image source, such as an application processor 52 or other suitable image source. Systems and methods described herein reference the application processor 52 as the image source. It should be understood that some or all of these systems and methods may be applied to other image generating circuitry to achieve similar power saving technical effects.

The application processor 52 generates and stores the image data in the external memory 40 for access by the display pipeline 38. The display pipeline 38 may be implemented via circuitry and packaged as a system-on-chip (SoC). The display pipeline 38 may be included in the processor core complex 18, the image processing circuitry 28, a timing controller (TCON) in the electronic display 12, other one or more processing units, other processing circuitry, or any combination thereof.

The display pipeline 38 may include a direct memory access (DMA) block 64, a configuration buffer 66, an output buffer 68, one or more image data processing blocks 46 (including a fetch block 70), and a time stamp queue 72. The display pipeline 38 may operate to retrieve pre-rendered image data from the external memory 40 for processing.

The application processor 52 may, in some cases, operate to generate time stamp queue 72 entries that correspond to image data stored in the external memory 40. Upon storing the time stamp queue 72 entries and the image data in memory, the display pipeline 38 operates to retrieve the stored image data and entries in preparation for output. The time stamp queue 72 entries may be reference when operating the electronic device 10 in an always-on mode and/or the autonomous frame presentation mode.

Figure 7:
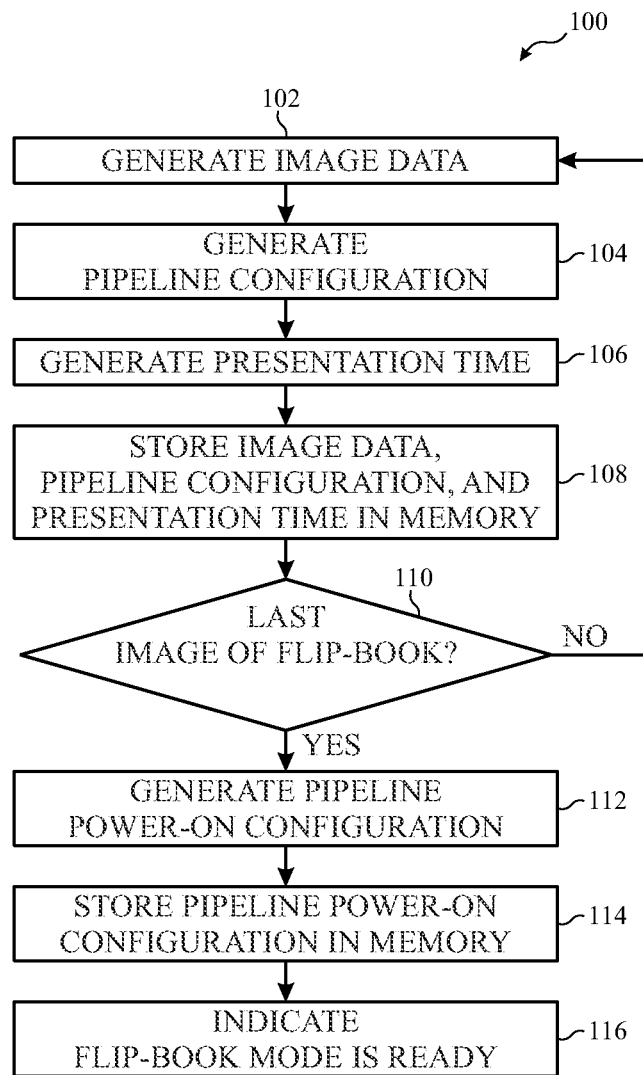
FIG. 7 is a flow diagram of a process for operating the application processor of FIG. 6, in accordance with an embodiment.

To help illustrate, an example of a process 100 for controlling operation of an application processor 52 coupled to an external memory 40 is described in FIG. 7. Generally, the process 100 includes generating image data (block 102), generating a pipeline configuration (block 104), generating a presentation time (block 106), storing image data, pipeline configuration, and presentation time in memory (block 108), determining if image is a last image of flip-book (block 110). In response to the image not being a last image, the process 100 includes repeating the generation of image data (block 102) and continuing the process 100. In response to the image being a last image, generating a pipeline power-on configuration (block 112), storing pipeline power-on configuration in memory (block 114), and indicating the flip-book mode (e.g., flip-book presentation mode) is ready (block 116). The process 100 may be implemented by executing instructions stored in a tangible, non-transitory, computer-readable medium, such as external memory 40, using processing circuitry, such as the application processor 52 or the system controller 44.

Thus, at block 102, the application processor 52 may generate image data. The application processor 52 may prepare a flip-book for future display by generating image data for each respective image frame of the flip-book. A flip-book may be a pre-rendered set of image frames. When pre-rendered, image data is generated for each image frame of the flip-book before being used to display a first image of the flip-book. The application processor 52 may pre-render the image data based on image content to be displayed at a future time as part of a flip-book.

The application processor 52 may, at block 104, generate a pipeline configuration to be implemented by a display pipeline 38 before processing the image data. The application processor 52 may generate a pipeline configuration corresponding to each image frame. The pipeline configuration may include one or more settings and/or one or more configurations to be applied to a display pipeline 38 prior to processing the flip-book image data for display. The pipeline configuration may include indications for register values, settings, image processing instructions, and the like. When applied, the display pipeline 38 is programmed to process the image data according to parameters defined in the pipeline configuration.

After generating the pipeline configuration, the application processor 52 may, at block 106, determine a target presentation time for the image. The presentation time indicates the time at which the image frame is to be displayed on an electronic display 12. The application processor 52 may determine a presentation time based on stored indications for appropriate presentation times based on image content included in the flip-book. For example, when a flip-book includes images of clock hands moving on a clock, the application processor 52 may determine that target presentation time of each successive image in the flip-book is one second after the target presentation time of a directly previous image. Sometimes a flip-book includes images to be presented at regular intervals, and thus the application processor 52 may define target presentation times of each image frame in the flip-book as relatively defined based on a previous presentation time. For example, when the flip-book is used to present a "screen-saver," the target presentation time may be set to any number of seconds or minutes (e.g., 30 seconds, 1 minute, 2 minutes, N minutes) after the target presentation time of a directly previous image frame.

At block 108, the application processor 52 may store the image data, the pipeline configuration, and the presentation time in an external memory 40. The application processor 52 may store the image data in a sequential order to be displayed at a future time. The image data, the pipeline configuration, and the presentation time may be stored at the same location in the external memory 40 and/or in different locations in the external memory 40. After storage into external memory 40, the DMA block 64 of the display pipeline 38 may retrieve the presentation time and a pointer indicating the location in memory where the pipeline configuration is stored.

Figure 8:
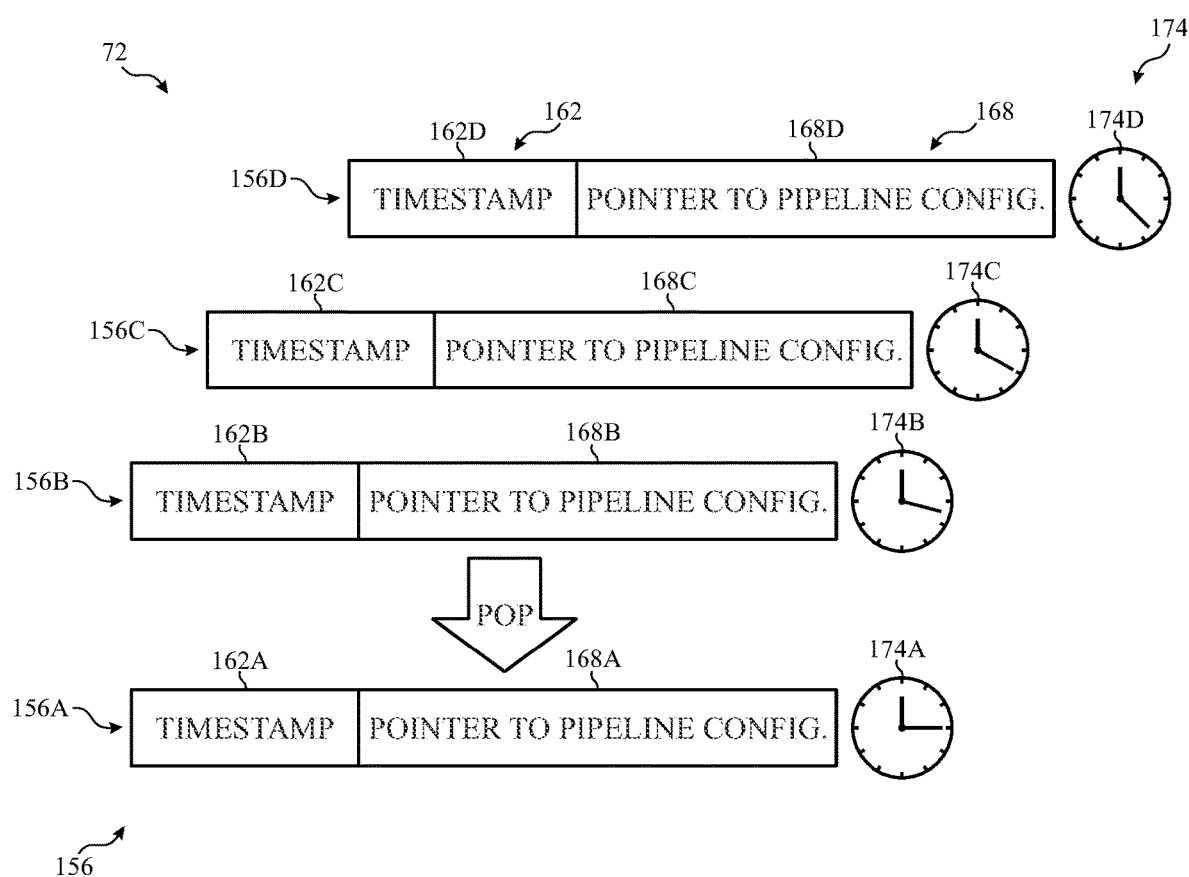
FIG. 8 is a diagrammatic representation of a time stamp queue corresponding with image frames to be displayed on the electronic display of FIG. 1, in accordance with an embodiment.

To help illustrate, an example of a time stamp queue 72 having one or more entries 156 (e.g., entry 156A, entry 156B, entry 156C, entry 156D) is shown in FIG. 8. Each entry 156 includes a time stamp 162 (e.g., time stamp 162A, time stamp 162B, time stamp 162C, time stamp 162D) and a pointer 168 (e.g., pointer 168A, pointer 168B, pointer 168C, pointer 168D). The entries 156 of the time stamp queue 72 each correspond to a different image frame 174. Each image frame 174 may thus be associated with a respective time stamp 162 and a respective pointer 168. The time stamp 162 may indicates a target presentation time for the image frame 174, and the pointer 168 may indicate where pipeline configurations are stored. Pipeline configurations may be retrieved and applied to the display pipeline 38 before processing image data corresponding to a present image frame 174.

A display pipeline 38 may "pop" respective entries 156 from the time stamp queue 72 for processing. Entries 156 may be "popped" a sufficient time (e.g., a threshold amount of time such as between 1.0 microseconds (µs) and 5.0 µs) prior to the target presentation time indicated by the time stamp 162. For example, the entry 156A has been popped for processing by the display pipeline 38 at a sufficient time prior to the time stamp 162A. After the entry 156A is popped, the display pipeline 38 may reference the pointer 168A, retrieve the corresponding pipeline configuration from the external memory 40, and use the retrieved pipeline configuration to prepare itself to process image data associated with the image frame 174A.

Returning to FIG. 7, after storing image data, pipeline configuration, and a presentation time, at block 110, the application processor 52 may determine if the most recently stored image data corresponds to a last image of a flip-book. Thus, the application processor 52 performs this check to determine if a most recently rendered image frame 174 is a last image frame 174 to be pre-rendered.

If the most recently rendered image frame 174 is not the last image frame 174 of the flip-book, at block 102, the application processor 52 may repeat the process 100. Thus, application processor 52 may continue to generate image data, pipeline configurations, and presentation times for each image (e.g., image frame 174) to be included in the flip-book.

When the most recently rendered image frame 174 is a last flip-book image, at block 112, the application processor 52 may continue to generate a pipeline power-on configuration. The pipeline power-on configuration may correspond to configuration data used to reconfigure (e.g., re-program) a display pipeline 38 after powering-on from a power-off state. For example, the pipeline power-on configuration may indicate where to fetch image data for display after power-on, processor interfacing commands, pipeline configuration to be applied to the display pipeline 38, clock and/or timing instructions, and the like. The application processor 52 may generate code, instructions, settings, values, or any combination thereof for packaging and/or grouping as the pipeline power-on configuration.

The application processor 52 may, at block 114, store the pipeline power-on configuration in external memory 40. The application processor 52 may store the pipeline power-on configuration at the same or different memory location as the image data, the presentation time, the pipeline configuration, or any combination thereof.

After completing the flip-book, at block 116, the application processor 52 may indicate that the flip-book mode is ready. The application processor 52 may indicate to the system controller 44 that the process 100 is complete and that the flip-book is ready. The application processor 52 may transmit an indication in the form of a bit, a flag, a signal, and the like to other components in the electronic device 10, such as the system controller 44. The system controller 44 and/or the display pipeline 38 may perform an action in response to receiving the indication. For example, the system controller 44 may power-off the application processor 52 and/or the display pipeline 38 to decrease power consumption by an electronic device 10.

Returning to FIG. 6, in preparing to display an image frame 174, the display pipeline 38 may access the time stamp queue 72. The time stamp queue 72 includes one or more entries 156 generated by the application processor 52 each associated with image data stored in external memory 40. The display pipeline 38 may pop a first entry 156 of the time stamp queue 72 at a configuration time based on a time stamp (e.g., time stamp 162A) and may reference the popped entry (e.g., entry 156A) to determine a storage location of pipeline configuration for the current image to be displayed (e.g., image frame 174A). The display pipeline 38 may use the target presentation time of the next entry 156 to determine a configuration time for the next image frame 174. In response to a present time being the configuration time for the next image frame 174, the display pipeline 38 may determine the location of the pipeline configurations based on the pointer 168. The display pipeline 38 may retrieve the pipeline configuration from a location in external memory 40 or another memory indicated by the pointer 168. The display pipeline 38 may use the DMA block 64 to retrieve the pipeline configurations from memory and may apply the pipeline configurations to itself via the configuration buffer 66.

After popping the time stamp queue 72, the display pipeline 38 may reference the time stamp 162 (e.g., time stamp 162B) to determine a next target presentation time corresponding to a next image frame 174 (e.g., image frame 174B) for display. The display pipeline 38 may read the time stamp 162 (e.g., time stamp 162B) of the subsequent entry 156 (e.g., entry 156B) after popping the current entry 156 (e.g., entry 156A). The display pipeline 38 may determine a configuration time associated with the image frame 174 (e.g., image frame 174B) based on the target presentation time of the image frame 174. The configuration time is the time when the display pipeline 38 begins retrieval and loading of the pipeline configurations, and thus equals at least a processing duration and a configuration duration before the target presentation time. Thus, after popping the time stamp queue 72, the display pipeline 38 may determine a next configuration time for a next image frame 174 to be displayed such that at that next configuration time, the display pipeline 38 pops the corresponding entry 156 and retrieves the pipeline configuration from the external memory 40.

After applying corresponding pipeline configurations for processing of a next image frame 174, the display pipeline 38 may process and complete preparations associated with displaying the image frame 174 prior to the time stamp 162. The display pipeline 38 may use an image data processing block 46 to prepare the image data for transmission to the display driver 42. Upon completion of processing, the display pipeline 38 may transmit the image data to the display driver 42 to enable display of the corresponding image frame 174 on the electronic display 12.

Based at least in part on image data transmitted by the display pipeline 38, the display driver 42 may generate and supply analog electrical signals to display pixels of the electronic display 12 to display an image frame 174. The display driver 42 may refresh the electronic display 12 according to various, predetermined refresh frequencies (e.g., 240 Hz, 120 Hz, 60 Hz, 50 Hz, 40 Hz, 30 Hz, 20 Hz, 10 Hz) to reduce an appearance of visual artifacts on the electronic display 12.

The electronic device 10 may include one or more processing pipelines (e.g., a display pipeline 38). The one or more processing pipelines may include a DMA block 64. The DMA block 64 may read (e.g., retrieve) image data from the external memory 40 and/or write (e.g., store) image data to the external memory 40. The DMA block 64 may retrieve pipeline configurations to program (e.g., configure) registers in the display pipeline 38 from the external memory 40 based on the pointers 168. For example, the DMA block 64 may program a configuration buffer 66 (e.g., a shadow first-in, first out buffer (FIFO)) with the pipeline configuration to program registers in the display pipeline 38 before processing of the image data. After processing, the display pipeline 38 may store image data in an output buffer 68 before outputting the image data to the display driver 42.

Image data retrieved from the external memory 40 may be processed in the image data processing block 46. The image data processing block 46 may process the image data to improve a perceived image quality of the image frame resulting from the image data. For example, the image data processing blocks 46 may include a color management block that converts image data from a source space to a display space of the electronic display 12. The image data processing blocks 46 may include a pixel contrast control block that applies tone maps to the image data to control a perceived contrast or a perceived white point based at least in part on environmental conditions, such as ambient light. The image data processing blocks 46 may also include a fetch block 70 that uses the DMA block 64 to retrieve image data for processing.

It is noted that although shown as one block in FIG. 6, it should be understood that the image data processing block 46 may include multiple processing components that include any suitable combination of hardware-based and/or software-based processing functions. Indeed, when the image data processing block 46 includes two or more blocks, each processing operational block may output processed data to another processing block or to the output buffer 68. This may allow image data (e.g., image data from the DMA block 64) to be processed sequentially. Sequential processing of the image data by respective processing operations or block of the image data processing block 46 may involve transmission of individual data bits, portions of data, portions of an image frame (e.g., subsets of image data defining an image frame), an entire image frame, an entire partial image frame, or the like to another processing operation or block of the image data processing block. In this way, any suitable amount of data may be passed from one block to another block to process the image data via the image data processing block 46. Some blocks of the image data processing block 46 may process data in parallel. For example, some blocks may involve a graphics processing unit capable of processing subsets of input data in parallel. It is also noted that parallel processing may occur between data being processed by the block as opposed to data being processing outside of the block. To explain differently with an example, data A being processed by block A may be processed in parallel by the block A, and data B being processed by block B may be processed in parallel with operations of the block A processing data A; however, sometimes data A may not be processed by the block A and by the block B in parallel. This may occur since the block A is to pass on the data A to the block B for further processing. It is noted that, in this example, data A and data B may be different subsets of image data for a same image frame; however, other combinations may also apply.

The image processing system 36, using the components described, may operate in one of many (e.g., four, five, N) operational modes. A first operational mode may be a normal mode (e.g., power-on mode, full power mode), where the application processor 52 works with the display pipeline 38 to render and process image frames 174 for display (e.g., active image frame rendering mode, active rendering of image frames). A second operational mode may be a power-gating mode, where the system controller 44 acts to power-gate the display pipeline 38 when idle in between processing of image data. A third operational mode may be a flip-book mode, where the application processor 52 pre-renders a flip-book and is powered-off once pre-rendering is complete, providing a reduction in power consumption. A fourth operational mode may be a flip-book power-off mode, where after the application processor 52 pre-renders the flip-book and once the display pipeline 38 is idle, while the application processor 52 is powered-off, the system controller 44 powers-off the display pipeline 38, or the image data processing blocks 56, until time to begin processing a new image for display. However, while the image processing system 36 may operate in a variety of operational modes, the display pipeline 38 processes image data in a similar manner regardless of the operational mode.

Figure 9:
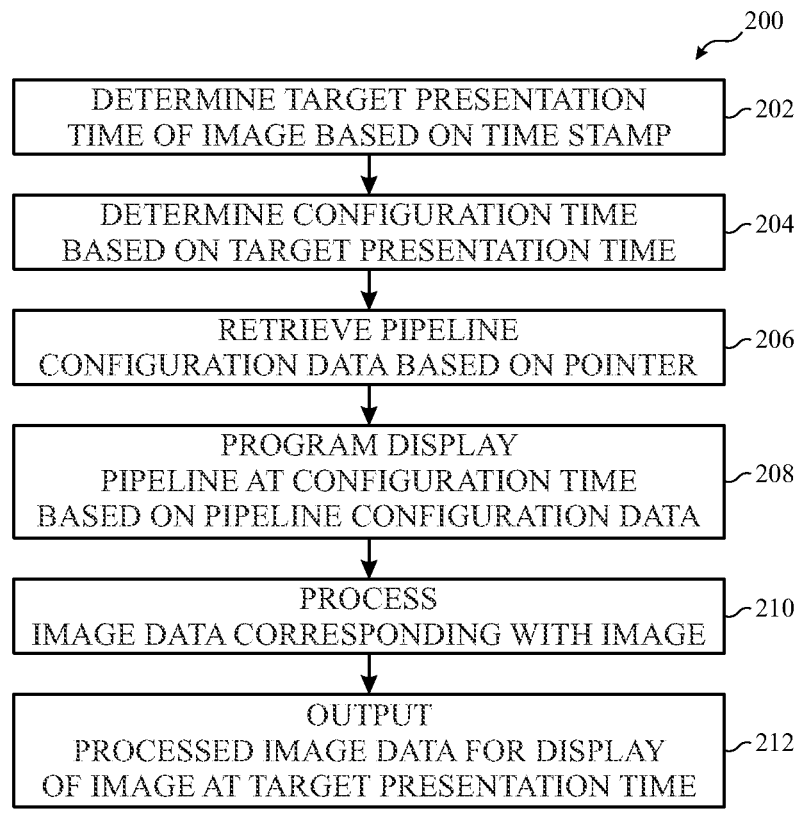
FIG. 9 is a flow diagram of a process for operating the display pipeline of FIG. 6, in accordance with an embodiment.

To help illustrate, an example of a process 200 for controlling operation of a display pipeline 38 is described in FIG. 9. Generally the process 200 includes determining a target presentation time of an image based on a time stamp (block 202), determining configuration time based on the target presentation time (block 204), retrieving pipeline configuration data based on a pointer (block 206), programming display pipeline at a configuration time based on pipeline configuration data (block 208), processing image data of the image (block 210), and outputting processed image data for display of the image at the target presentation time (block 212). The process 200 may be implemented at least in part by executing instructions stored in a tangible, non-transitory, computer-readable medium, such as external memory 40, using processing circuitry, such as the display pipeline 38 and/or the system controller 44. The process 200 may be implemented at least in part based on circuit connections formed in an electronic device 10.

Thus, the display pipeline 38 may, at block 202, determine a target presentation time of an image frame 174 based on a time stamp. The display pipeline 38 may pop the time stamp queue 72 to gain access to a next entry corresponding to a next image to be displayed. For example, the display pipeline 38 pops the time stamp queue 72 to access entry 156A corresponding to the next image frame 174A. Upon popping, the display pipeline 38 may have access to data of the entry 156A, such as the time stamp 162A. The time stamp 162 corresponds to the target presentation time of the image frame 174.

After determining the target presentation time, the display pipeline 38 may, at block 204, determine a configuration (programming) time based on the target presentation time. The configuration time may represent a time to begin configuring the display pipeline 38 to prepare for processing of image data. To determine the configuration time, the display pipeline 38 may subtract a time duration from the target presentation time. The time duration may correspond to a set duration of time used to program a display pipeline 38, to process image data for display, and to transmit image data for display, such that beginning all these activities at the configuration time permits display at the target presentation time.

The display pipeline 38 may, at block 206, retrieve pipeline configuration data based on the pointer 168. As previously described, the pipeline configuration data may be stored by the application processor 52 in external memory 40. A pointer 168 may indicate where the pipeline configuration data is stored in external memory 40. Thus, the display pipeline 38 may use the DMA block 64 to retrieve pipeline configuration data stored in external memory 40 as indicated by the pointer 168.

Upon retrieving pipeline configuration data, the display pipeline 38 may, at block 208, program itself with the pipeline configuration data at the pipeline configuration time. Upon retrieval of pipeline configuration data, the DMA block 64 may transmit the pipeline configuration data to the configuration buffer 66, where the pipeline configuration data is used to adjust settings of the display pipeline 38 to prepare to process new image data, for example, by adjusting register values corresponding to the settings. The transmission of the pipeline configuration data to the configuration buffer 66 may occur at the configuration time.

After programming, the display pipeline 38 may, at block 210, process image data corresponding to a new image for display. To process the image data, the display pipeline 38 may retrieve the image data from the external memory 40 via instructions issued to the fetch block 70. Upon retrieval from the external memory 40, the display pipeline 38 may process image data according to newly applied configurations to improve perceived image quality through the processing. For example, the display pipeline 38 may process image data to make the final image display brighter or have a more appropriate white point to compensate for environmental changes.

Upon completion of the processing of image data, the display pipeline 38 may, at block 212, output the processed image data for display of the new image at the target presentation time. After processing image data, the display pipeline 38 transmits the processed image data to the display driver 42 for output to the electronic display 12. The display driver 42 may prepare the image data for display by converting the image data into one or more electrical signals that cause the electronic display 12 to display the new image.

Figure 10:
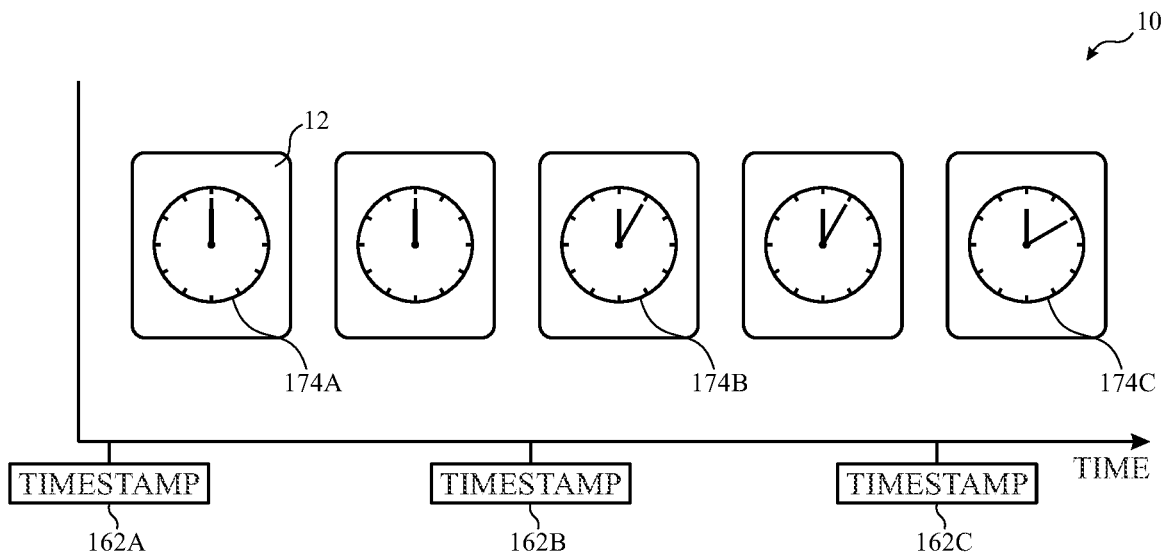
FIG. 10 is an example of the electronic device of FIG. 5 displaying image frames based on the time stamp queue of FIG. 8, in accordance with an embodiment.

To help illustrate, an example of the electronic device 10 displaying the image frames 174 over time on the electronic display 12 is shown in FIG. 10. The electronic device 10 may operate in a normal mode, a power-gating mode, or a flip-book mode without a viewer of the electronic display 12 recognizing the difference (e.g., based on perceived quality of image frames 174 displayed). Generally, the electronic device 10 at the presentation time indicated by the time stamp 162A updates to display image frame 174A through a display pipeline 38 processing image data of the image frame 174A for display. At a configuration time prior to time stamp 162B, the display pipeline 38 processes image data corresponding to the image frame 174B for display and displays the image frame 174B at the presentation time indicated by time stamp 162B. The process 200 may repeat at a configuration time occurring before time stamp 162C, the display pipeline 38 processes image data corresponding to the image frame 174C for display at the presentation time indicated by the time stamp 162C. It is noted that a period of time between the time stamp 162A and the time stamp 162B may be longer or shorter than a period of time between the time stamp 162B and the time stamp 162C.

If the electronic device 10 is operating in the normal mode, no power-gating or powering-off of the display pipeline 38 or the application processor 52 may occur. However, if the electronic device 10 is operating in the power-gating mode, the system controller 44 may operate to power-gate the display pipeline 38 while idle in-between processing of image data for the image frame 174A or image frame 174B and retrieving the next pipeline configuration data to process new image data.

When the electronic device 10 is to be operated in the flip-book mode, the application processor 52 may generate a flip-book corresponding to pre-rendered images to prepare for the flip-book mode. Upon the application processor 52 completing the flip-book, the system controller 44 may operate to power-off the application processor 52. While in a flip-book power-off mode, the system controller 44 may power-off or further reduce power supplied to the display pipeline 38 while idle between of processing of flip-book images for display and while the application processor 52 is powered-off. It is noted that the system controller 44 may power-off the application processor 52 at any suitable time, such as immediately after the application processor 52 indicates the flip-book is ready or a period of time after the application processor 52 indicates the flip-book is ready, such as in the case if other asynchronous events prevent the application processor 52 from being powered-off. The application processor 52 may even be powered-off after the display pipeline 38 begins processing of the flip-book (e.g., application processor 52 is powered-off during flip-book processing). Because of this, the application processor 52 may be powered-off during the display of any suitable frame of the flip-book, as long as timing and signaling constraints are met to permit returning power to the application processor 52 with enough to process the next flip-book.

Keeping the foregoing in mind, to save power, the electronic device 10 may use multiple power states, such as a first power state (e.g., a mid-power power state, a "medium power" power state) that consumes an amount of power between a second power state (e.g., an "awake" state, fully powered on, receiving full supply power) and a third power state (e.g., relatively lower-power consumption state, a power-gated state). Example transitions between power states is shown in FIG. 11.

Figure 11:
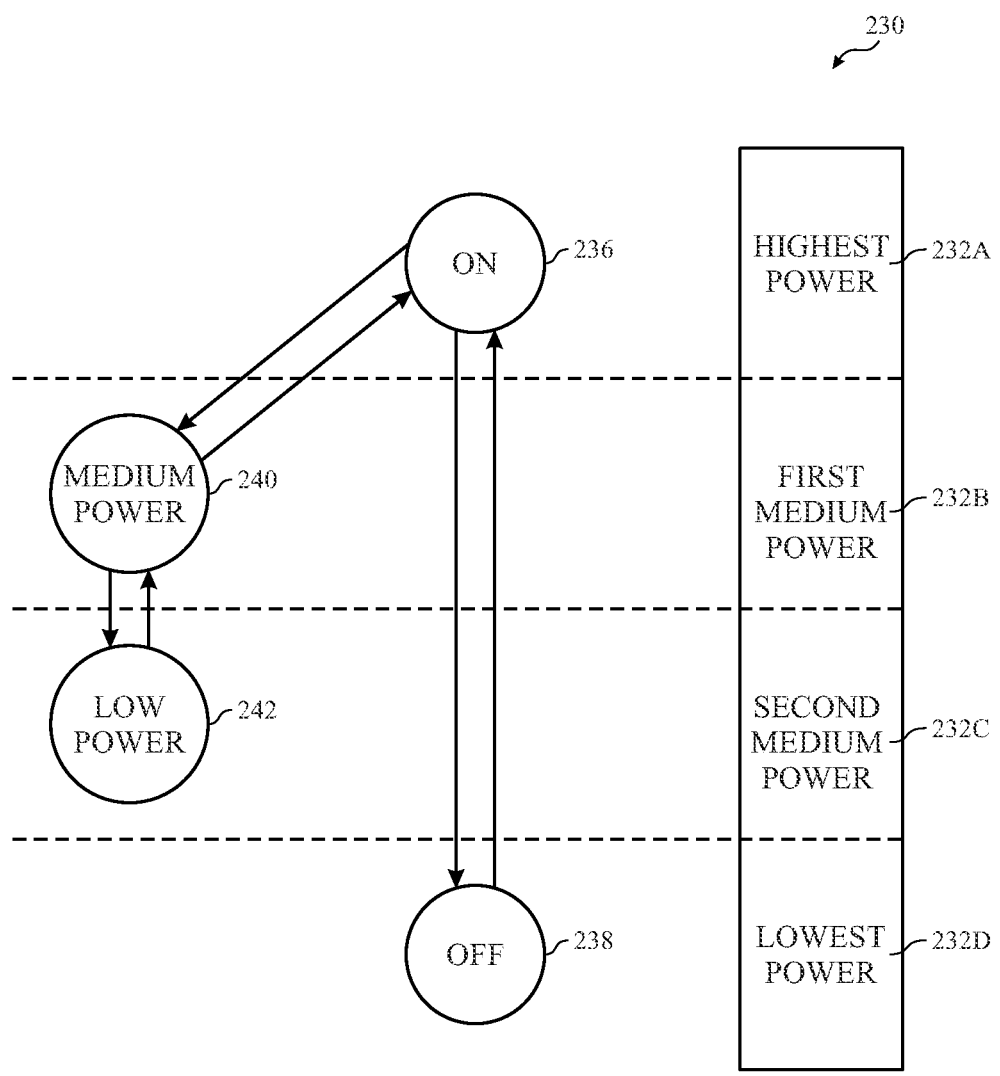
FIG. 11 is a diagrammatic representation of example power states of a power management integrated circuit (PMIC), in accordance with an embodiment.

FIG. 11 is a visualization of various power states 230 and the transitions between the power states of at least a portion of the electronic device 10, as may occur with systems and processes able to provide of a "medium power" power state. The power states visualized in FIG. 11 are explained herein using components shown in at least FIG. 12, and thus the figures are discussed together.

Figure 12:
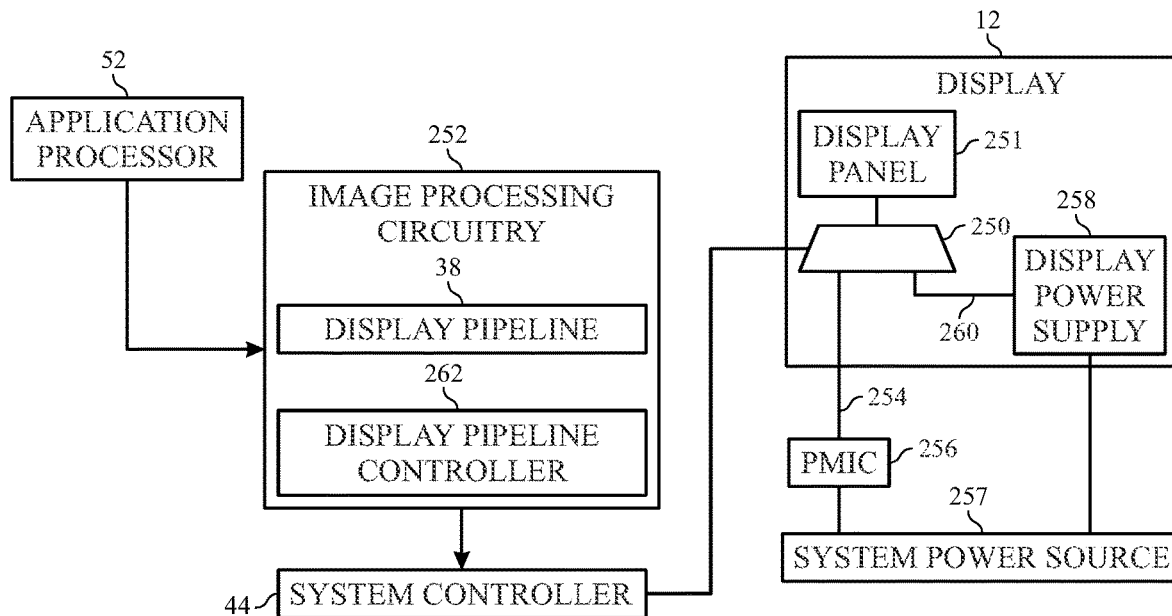
FIG. 12 is a block diagram of the display pipeline of FIG. 6 and an application processor, in accordance with an embodiment.

FIG. 12 is a block diagram of circuitry of the electronic device 10 implementing a power state switch between states shown in FIG. 11. For example, the controller 44 may operate one or more components of the electronic device 10 between an "on" operational mode (e.g., represented by visualization 236), an "off" operational mode (e.g., represented by visualization 238), a "medium power" operational mode (e.g., represented by visualization 240), and a "low power" operational mode (e.g., represented by visualization 242). By changing operational modes of the components, the controller 44 may change an overall power consumed by the electronic device 10, for example, between a highest power consumption level 232A and a lowest power consumption level 232D (e.g., zero power).

To do so, as shown in FIG. 12, the image processing system 36 may include a switch 250 that changes a power supply rail to display panel 251 from a first power rail 254 from a power management integrated circuit (PMIC) 256 to a second power rail 260 from a display power supply 258 (e.g., second power source) in response to a control signal from the system controller 44. This change may occur over time, such that at a first time the power rail 254 supplies the display panel 251 (e.g., a portion of the electronic display 12) and at a second time is switched to cause the power rail 260 supplying another portion of the electronic display 12 to also supply the display panel 251. It is noted that the display power supply 258 and the PMIC 256 may receive electrical signals from another source such as an external power supply, a wall outlet, a solar panel, a battery, a relatively more global power supply for the electronic device 10, or the like. The image processing system 36 of the electronic device 10 also includes the display pipeline 38 controlled by a display pipeline controller 262.

In FIG. 11, the various power states 230 visualize power consumption of the electronic device 10 (e.g., respective components of the electronic device 10) between a maximum power consumption of the electronic device 10 (e.g., represented by level 232A) and a minimum power consumption of the electronic device 10 (e.g., "lowest power" consumed by the electronic device represented by level 232D, "off"). It is noted that the PMIC 256 of the electronic device 10 may help deploy the various power states.

For example, the PMIC 256 may help manage power supplied to the electronic device 10 by the power source 26. The PMIC 256 may distribute power throughout various components of the electronic device 10 through power rails, such as power rails. To do so, the PMIC 256 may throttle and/or control characteristics of the power (e.g., voltage and/or current characteristics) provided to the different components of the electronic device 10. For example, the electronic display 12 may receive voltages and currents having a first set of signal characteristics (e.g., amplitude, frequency, noise) while the network interface 24 may receive voltage and currents having a second set of signal characteristics. The PMIC 256 may maintain different threshold and/or quality control checks to permit signals with certain characteristics to be transmitted to the various components. For example, the PMIC 256 may not permit signals having unsuitable amplitude (e.g., signal characterized by an amplitude that exceeds an amplitude threshold) to be transmitted to the electronic display 12 to reduce a likelihood of unsuitable operation of the electronic display 12.

Power rails maintained by the PMIC 256 may be able to be powered off or the PMIC 256 may be able to control which signals are transmitted by the power rails (e.g., supplied to the various components of the electronic device 10). The PMIC 256 having the control over signals supplied to the power rails may improve operation of the electronic device 10 by permitting some components of the electronic device 10 to receive fewer amounts of power than other components. For example, the PMIC 256 may selectively reduce power supplied to subsets of components of the electronic device 10 rather than entire portions of circuitry and/or the entire electronic device 10, providing reduced power consumption levels of the electronic device 10 without interrupting operations. Indeed, the electronic device 10 may reduce power supplied to interface circuitry (e.g., input/output circuitry) of the application processor 52 when powered off.

When operating to change power supplied to the different power rails, the PMIC 256 may provide various operational modes of the electronic device corresponding to different power states, including an "on" operational mode (e.g., represented by visualization 236) of the PMIC 256 corresponding to the highest power consumption level 232A, an "off" operational mode (e.g., represented by visualization 238) of the PMIC 256 corresponding to the lowest power consumption level 232D, a "medium power" operational mode (e.g., represented by visualization 240) of the PMIC 256 corresponding to a first medium power consumption level 232B, and a "low power" operational mode (e.g., represented by visualization 242) of the PMIC 256 corresponding to a second, lower medium power consumption level 232C. Additional power states of the PMIC 256 may exist in some cases, and these systems and method may be applied to or with the additional power states. The PMIC 256 may transition from the "off" operational mode to the "on" operational mode, and may access the "medium power" operational mode and/or the "low power" operational from the "on" operational mode. By transitioning between the different operational modes 236, 238, 204, 242, the PMIC 256 may adjust its overall power consumption to a medium power consumption level (e.g., first medium power level 232B, second medium power level 232C) between the highest power consumption (e.g., level 232A) and the lowest power consumption (e.g., level 232D).

To transition between operational modes, the PMIC 256 may change power supplied on its different power rails. The PMIC 256 is shown in FIG. 12 as outputting power to the switch 250. It should be noted that the PMIC 256 may also be used to power the image processing circuitry 252, the system controller 44, the application processor 52, and/or other components of the electronic device 10 although not particularly depicted in FIG. 12. Indeed, the PMIC 256 may operate as or in coordination with the power source 26.

For example, to transition from the "off" operational mode to the "on" operational mode, the PMIC 256 may supply power to each power rail consistent with power-on operational processes (e.g., to power on from an off state). To transition from the "on" operational mode to the "medium power" operational mode, the PMIC 256 may reduce power supplied on a power rail supplied to the display pipeline 38 and/or stop power supply to an application processor 52. To transition from the "medium power" operational mode to the "low power" operational mode, the PMIC 256 may further reduce power supplied to the display pipeline 38 while the application processor 52 continues to be powered off. To return to the "on" operational mode from the "low power" operational mode or the "medium power" operational mode, the PMIC 245 may return power to the power rail for the display pipeline 38 and to the power rail for the application processor 52. To return to the "off" operational mode from the "on" operational mode, the PMIC 256 may follow a power off sequence.

To transition from the "on" operational mode to the "medium power" operational mode and/or to the "low power" operational mode, the PMIC 256 may reduce power supplied to the display pipeline 38. These reduction operations may be performed substantially simultaneous to operating the display pipeline 38 in a flip-book mode. In this way, the PMIC 256 may power off the application processor 52 in response to the application processor 52 determining that operating the electronic device 10 in the flip-book operational mode is permitted and in response to the application processor 52 completing rendering of a flip-book for the display pipeline 38 to use to continue to present images on the electronic display 12.

In some cases, however, to transition from the "on" operational mode to the "medium power" operational mode and/or to the "low power" operational mode, the system controller 44 may cause the PMIC 256 to reduce power supplied to the display panel 251 (e.g., reduce to zero or negligible amount of power consumed, stop from powering) by operating the switch 250. Operating the switch 250 may be performed in response to the system controller 44 determining that less power is expected to be used to present an image frame via the display panel 251. For example, the system controller 44 may set a register accessible to the display driver circuitry of the electronic display 12 that controls the operation of a multiplexer representing the switch 250. Operating the switch 250 into a different state causes the display panel 251 to be powered from the display power supply 258 (e.g., which also supplies power to driver circuitry or the DDIC of the electronic display 12), thereby reducing power consumed by the electronic display 12 and/or the electronic device 10. In some cases, the display power supply 258 is disposed internally to a display driver integrated circuit (DDIC) of the electronic display 12 that distributes power to components of the electronic display 12, and thus the power rail 260 may be said to be a DDIC power rail. It should be understood, however, that the display power supply 258 may be located in additional locations and/or within additional components of the electronic display 12 and/or the display driver 42, including being disposed on a same chip that the display pipeline 38 is disposed. The system controller 44 may transmit control signals to the PMIC 256 to change the power used to supply the display panel 251, such as to a lower amplitude and/or to change a power rail, in response to determining to switch the supply of the display panel 251.

The system controller 44 may operate the display pipeline 38 in an operational state below "awake" by operating the application processor 52 off, by reducing power supplied to the image processing circuitry 252, by changing the power supply to the display panel 251, or a combination of the three. The operational state below "awake" of the display (e.g., reduced-power consumption state, represented by visualization 240) pipeline 38 may be considered a "medium power" operational mode. The "medium power" operational mode may be used in conjunction with power-gating of the display pipeline 38 (e.g., in response to an indication that the flip-book mode is ready) and/or in response to a determination by the system controller 44 that the display pipeline 38 is idle. However, other circumstances may arise that may cause the system controller 44 to determine to power-gate the display panel 251. These circumstances may include when image frames may be presented at relatively lower frequencies (e.g., less than 60 Hz), the image frame may be presented using lower display brightness values (e.g., less than or equal to half of maximum display brightness value), the image frames may be presented corresponding to relatively dark image colors, or the like. As elaborated above, in some cases, the "medium power" operational mode is accessed from a fully awake state of the electronic device 10.

To provide an example operation, when the electronic device 10 powers on, the system controller 44 may operate the PMIC 256 in a fully on, highest power consumption level 232A, as the "on" operational mode. During a normal operation, the application processor 52 may actively render images for presentation on the electronic display 12. Image frames that are actively rendered may be presented using image data that is processed via image processing circuitry 252, and more particularly by the display pipeline 38 operating in response to control signals from the display pipeline controller 262. Once processed, the image data transmits to the electronic display 12 for use in presentation of the image frame. The display panel 251 may receive power from the PMIC 256 via a power rail 254 (e.g., a dedicated power rail). At some point during operation, the application processor 52 may determine that it is a suitable time to enter an always-on operational mode (e.g., a flip-book mode). In response to the determination, the system controller 44 may power off the application processor 52. In response to an independent determination related to image frame content and/or refresh rates (e.g., frequency at which new or subsequent image frames are to be presented via the display panel 251), the system controller 44 may cause the display panel 251 to be supplied from the display power supply 258 (e.g., via power rail 260) of the electronic display 12 as opposed to the PMIC 256 (e.g., via power rail 254) using the switch 250. Changing the power supply used for the display panel 251 may reduce power consumed by the electronic device 10. Moreover, the PMIC 256 may power off the power rail 254 and reduce power consumption of the PMIC 256, thereby reducing overall power consumption levels of the electronic device 10. It is noted that the power rail 254 and the power rail 260 may supply different electrical signals, such as different amounts of power. For example, the power rail 254 may supply higher amounts of power than the power rail 260 when coupled to the image processing circuitry 252, or vice versa. Furthermore, the display power supply 258 may filter and/or process voltage or current signals received from the system power source 257 to generate supply signals more suitable for powering circuitry of the electronic display 12.

When exiting the always-on operational mode, the system controller 44 may return full power to the image processing circuitry 252 and/or the application processor 52 by coupling the image processing circuitry 252 to the PMIC 256 and/or returning power to the application processor 52. The system controller 44 may return full power to the image processing circuitry 252 and/or the application processor 52 to prepare for active rendering of image frames. Entering and exiting the always-on operational mode may occur in parallel and independent of operations controlling the power supply of the display panel 251. However, it is noted that operations controlling the power supply of the display panel 251 may be based on configurations of the image processing circuitry 252, configurations of the flip-book, data of the flip-book, or the like, at least to the extent that this information provides indications of how the display panel 251 is to be driven in the future (e.g., later time when one of the queued image frames is processed and presented via the display panel 251).

Figure 13:
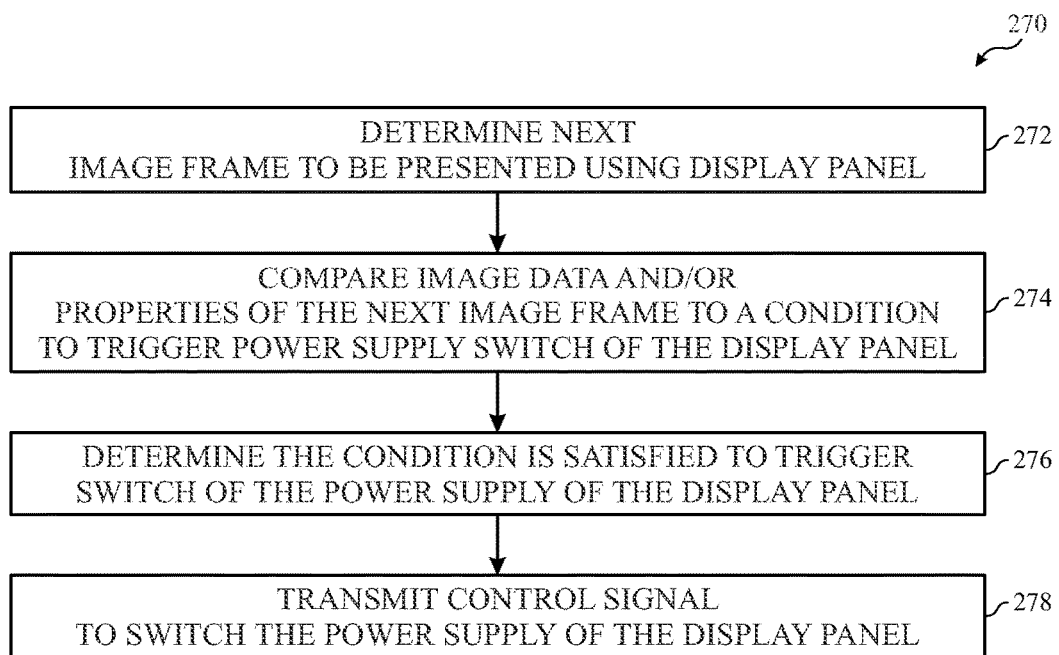
FIG. 13 is a flow diagram of a process for changing a power supply used for powering of a display panel of the display of FIG. 1, in accordance with an embodiment.

To elaborate, FIG. 13 is flowchart of a process 270 for operating the electronic display 12 to consume less power by changing a supply of the display panel 251 from the PMIC 256 to the display power supply 258. The system controller 44 is described as performing the process 270. It is noted that the process 270 may be implemented by executing instructions stored in a tangible, non-transitory, computer-readable medium, such as controller memory 50, using processing circuitry, such as the system controller 44 and/or the controller processor 48. The process 270 may be implemented at least in part based on circuit connections formed in an electronic device 10. It is also noted that the operations of the process 270 are shown in a particular order but that many of the operations may be performed in any suitable order using any suitable combination of hardware components and software operations.

Thus, the system controller 44 may determine, at block 272, a next image frame or a flip-book to be presented using the display panel 251. In some cases, the system controller 44 may perform the process 270 before each image frame is presented and/or on a periodic schedule (e.g., perform process 270 every 5 minutes, each 20 image frames, N time period, X image frame count, for every flip-book). Sometimes, the determination may be performed in response to an indication from the image processing circuitry 252 and/or the application processor 52 to initiate a "medium power" operational mode. The indication may correspond to the flip-book being ready, such as the indication transmitted at block 116 of FIG. 7 from the application processor 52 and/or may correspond to the image processing circuitry 252 being prepared to power gate. The indication may be a control signal transmitted between components, a flag and/or bit set accessible between components, or the like. In this way, the indication may be generated by an image source of the electronic device 10.

Using the next image frame, at block 274, the system controller 44 may compare image data of the next image frame and/or properties of the next time frame to a condition to determine to trigger the power supply switch of the display panel 251. The condition may relate to a refresh rate being used for the next image frame, image data being used for the next image frame, whether or not the next image frame is a partial frame update, global brightness values to be used to present the next image frame, brightness values of the image frame, environment changes to be implemented via presentation of the next image frame (e.g., compensating for the electronic device 10 being physically disposed in a dark ambient environment or inside a building). The condition may be manifested as a threshold amount or threshold percent of change. For example, the image data of the next image frame may be suitably dark to trigger the switch when the image data includes more than 50 percent (%) data lower than a gray level of 20. Any combination of condition and threshold amount may be used to trigger the switch, as well as various combinations of conditions and/or thresholds (e.g., image data is to be suitably dark and the refresh rate is to be suitably slow before switching the power supply for the display panel 251 to the display power supply 258). The condition may also include a suitably low present global brightness setting of the electronic display 12 (e.g., as defined by an operating system of the electronic device 10).

When the image data and/or properties of the next image frame meet the condition, at block 276, the system controller 44 may, at block 278, transmit a control signal to operate the switch 250 to couple the display panel 251 to the display power supply 258 as opposed to the PMIC 256. In some cases, transmitting the control signal may involve setting a bit or control parameter in a register that is automatically transmitted to or read by the switch 250 as a control signal.

When the display panel 251 is powered from outputs of the display power supply 258 as opposed to the PMIC 256, the overall power consumed by the electronic device 10 may also reduce.

The system controller 44 may switch the power supply of the display panel 251 to the PMIC 256 in response to determining that relatively higher amounts of power are to be used to present upcoming or incoming image frame. The instructions to exit a flip-book mode to permit active rendering of image data may coincide with transmission of a control signal to the switch 250 to change the power supply of the display panel 251 when, for example, the refresh rate of the electronic device 10 is greater than a threshold amount used as a condition to trigger the switch of the power supply. In other words, exit from the flip-book mode may occur independently from a switch of the power supply of the display panel 251. A relationship between the two operational transitions (e.g., flip-book mode transitions, power supply of display panel 251 transition) may be related to content of image frames being presented and/or refresh rates being used to present the image frames.

Figure 14:
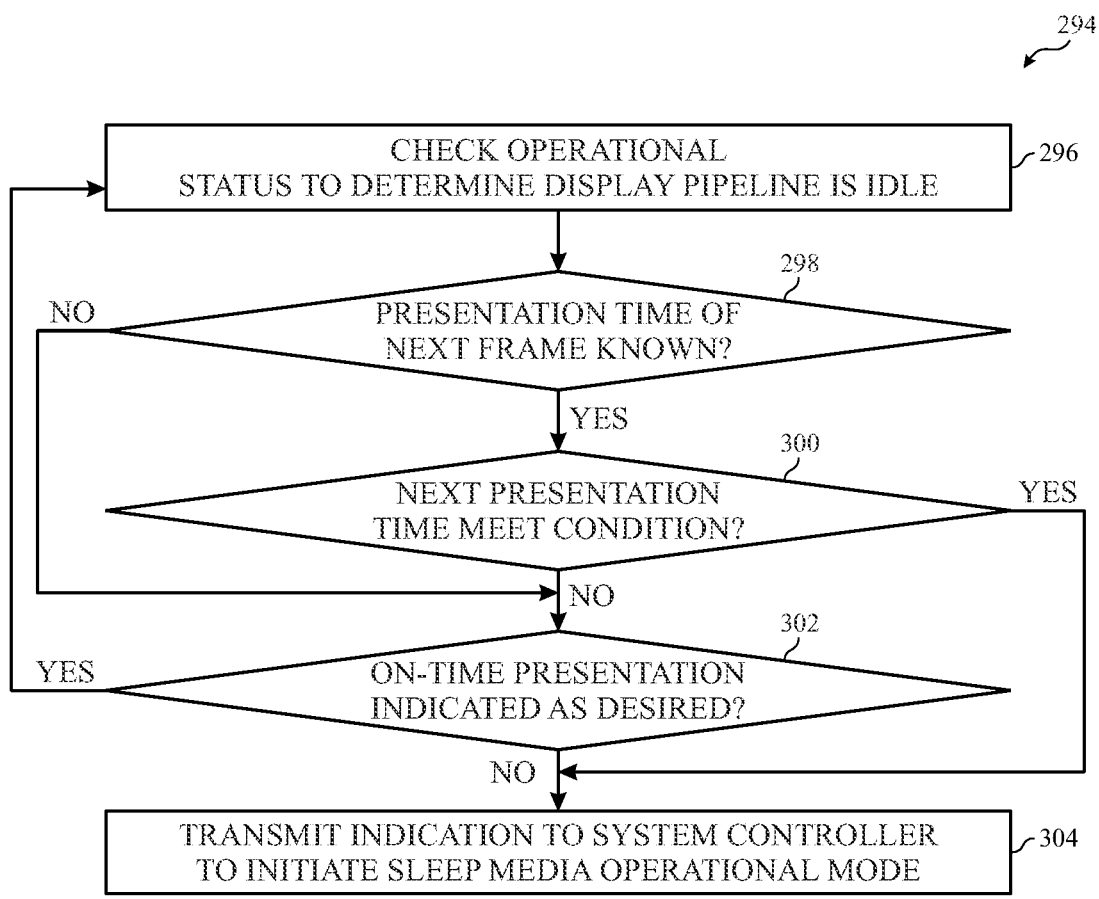
FIG. 14 is a flow diagram of a process for determining to operate the display pipeline of FIG. 6 and the application processor of FIG. 11 in a medium power operational mode, in accordance with an embodiment.

To elaborate, FIG. 14 is flowchart of a process 294 for determining to operate the image processing circuitry 252 to consume less power. The process 294 is described as performed by the display pipeline controller 262. However, it is noted that the process 294 may be implemented by executing instructions stored in a tangible, non-transitory, computer-readable medium, such as controller memory 50, using processing circuitry, such as the system controller 44 and/or the controller processor 48. The process 294 may be implemented at least in part based on circuit connections formed in an electronic device 10. It is also noted that the operations of the process 294 are shown in a particular order but that many of the operations may be performed in any suitable order using any suitable combination of hardware components and software operations.

Thus, at block 296, the display pipeline controller 262 may check an operational status of the display pipeline 38 to determine that the display pipeline 38 is idle as opposed to processing image data. The display pipeline 38 may have one or more operational statuses transmitted to or accessible (e.g., readable) by the system controller 44 and/or the display pipeline controller 262. An example operational status is whether the display pipeline 38 is idle, or, in other words, is not currently popping the time stamp queue 72, is not currently retrieving data (e.g., configuration data, image data), is not currently processing image data, is not currently outputting image data to the display driver 42, or the like. The display pipeline 38 transmits signals communicating its operational status. For example, the display pipeline 38 may transmit a signal indicating an idle operational state of the display pipeline 38. Thus, the system controller 44 and/or the display pipeline controller 262 may receive the signals indicative of an operational status to determine the operational status of the display pipeline 38.

At block 298, when the display pipeline 38 is idle, the display pipeline controller 262 may determine whether a time of a next frame is known. This may correspond to a frame of a flip-book, since pre-rendered image frames may be associated with presentation times. When the next presentation time is known for the next image frame to be presented via the electronic display 12, the display pipeline controller 262 may, at block 300, determine whether the next presentation time meets a condition, such as a condition for being suitably in the future (e.g., a threshold amount of time in the future). The display pipeline controller 262 may compare a difference between a current time and the presentation time to a duration threshold (e.g., a duration of time that corresponds to a suitable amount of time in the future, N number of processing durations before a target presentation time, 3 processing durations before a target presentation time). The display pipeline controller 262 may use this comparison to determine whether the next presentation time is a sufficient amount of time in the future to justify the power cost associated with operating the display pipeline in a reduced power state and/or powering off the display pipeline controller 262. This condition check of block 300 may help verify that powering off the application processor 52 and/or power-gating the PMIC 256 is to save more power than is spent powering off or power-gating the components. To explain differently, there is some power cost associated with returning power to (e.g., starting up) the display pipeline controller 262. However, there also exists a threshold duration of time in which, when the display pipeline controller 262 and/or the PMIC 256 is power reduced and/or powered off long enough (e.g., at least for the threshold duration of time), the adjustment to the power state outweighs the power costs and leads to an overall reduction in power consumed.

When the presentation time of the next frame is not known or when the next presentation time does not satisfy the condition of block 300, the display pipeline controller 262 may, at block 302, determine whether on-time presentation is desired for a next image frame. On-time presentation may be desired for an actively rendered frame and/or for a frame to be generated after a user of the electronic device 10 begins to use the electronic device 10 after power-off of the display pipeline controller 262. Late and/or delayed presentation of the next image frame may sometimes be permitted, such as when a pre-rendered series of image frames are played without a reference to a duration of time. For example, sequential presentation of a photo album on the electronic display 12 when idle may be relatively less sensitive to a delay in transition between the images than a sequential presentation of a clock, where a delay between renderings of the images of faces of the clock may be perceivable by a user. Whether or not a particular pre-rendered image frame is to be presented on-time may be indicated as a status bit, a flag, in metadata, or the like in the pipeline configuration for the particular image frame.

In response to the display pipeline controller 262 determining, at block 302, that on-time presentation of the next image frame is desired, the display pipeline controller 262 may proceed to block 296 to repeat the process of determining whether the display pipeline is idle based on its operational status. The display pipeline controller 262 may determine to permit the next image frame to present on-time by instructing the system controller 44 to not power gate the image processing circuitry 252 when doing so may delay the next image frame.

When, however, power gating the image processing circuitry 252 may not delay the next image frame, the display pipeline controller 262 may, at block 304, transmit an indication to the system controller 44 to initiate a reduced power operational mode. While one or more components of the electronic device 10 is in the reduced power operational mode, one or more portions of the display pipeline 38 may be power gated, reducing power consumed by the image processing circuitry 252 and thus reducing overall amounts of power consumed by the electronic device 10.

Indeed, after power-gating (e.g., reducing supply power to zero, reducing supply power) the display pipeline 38 to the "low power" operational mode (e.g., represented by visualization 242) when the display pipeline 38 is idle, the system controller 44 may subsequently increase supplied power to the display pipeline 38 when the display pipeline 38 is preparing to process a subsequent frame in the flip-book. The system controller 44 may instruct the display pipeline 38 and/or the display pipeline controller 262 to operate in the "medium power" operational mode (e.g., represented by visualization 240) where a subset of operational abilities of the image processing circuitry 252 may be powered using a reduced amount of supplied power from the PMIC 256.

Figure 15:
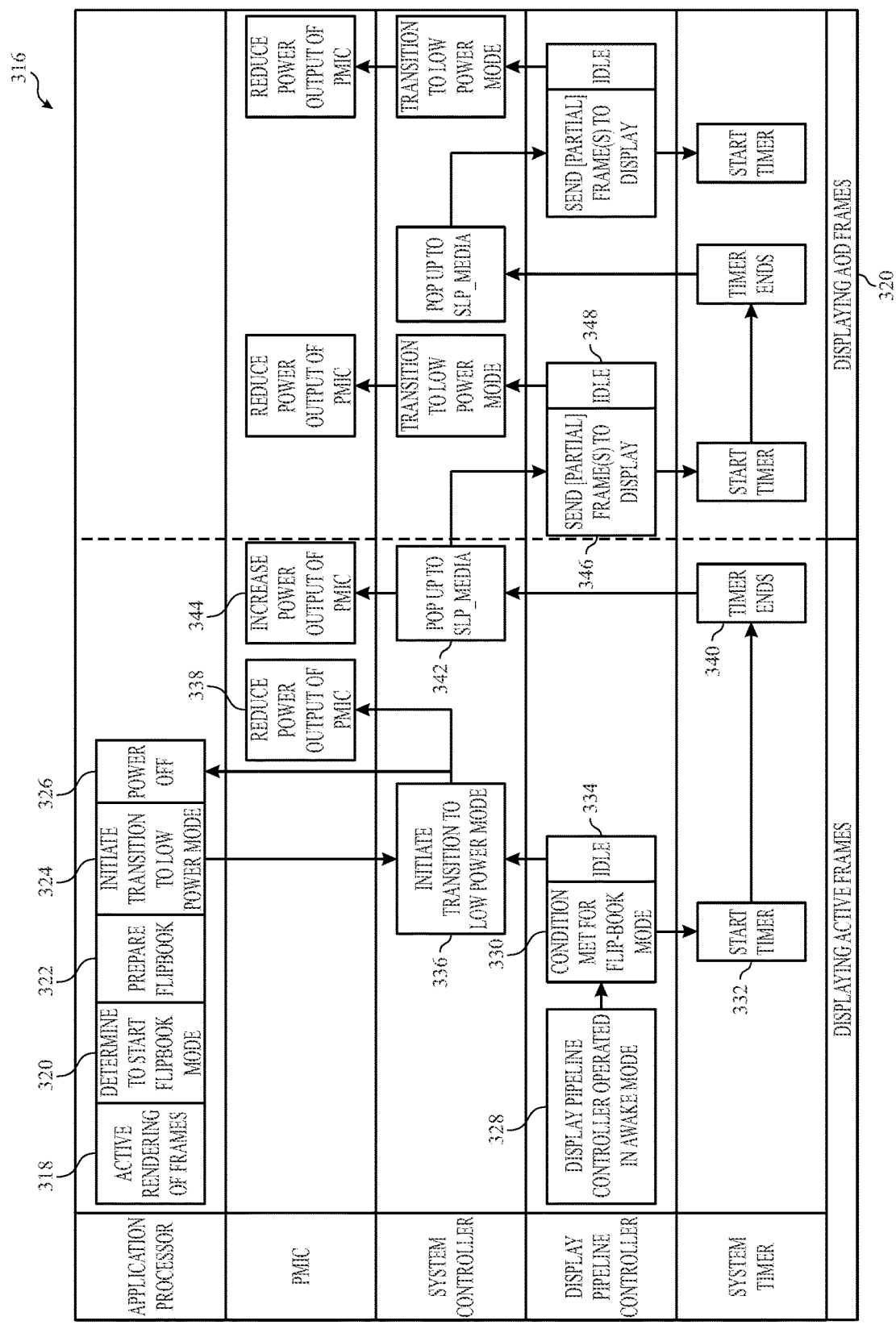
FIG. 15 is a diagrammatic representation of an example operational flow of the electronic device of FIG. 1 operating the display pipeline of FIG. 6 and/or FIG. 12 to enter a flip-book mode, in accordance with an embodiment.

To elaborate, FIG. 15 is a flow diagram 316 visualizing operations of the application processor 52, the PMIC 256, the system controller 44, the display pipeline controller 262, and a system timer (e.g., managed by the system controller 44 or an always-on component that remains active in a lower power mode, even while the system controller 44 is off) when presenting images associated with a presentation of a flip-book via the electronic display 12. The flow diagram 316 shows generally a transition from operations associated with an active rendering of frames (e.g., block 318) to operations associated with presentation of pre-rendered frames (e.g., blocks corresponding to portion 320 of operations).

When the electronic device 10 is actively rendering image frames for presentation via the electronic display 12, the application processor 52 may actively render the image frames for presentation (e.g., operations of block 318). At some point during active rendering of image frames, the application processor 52 may determine to initiate a flip-book mode (e.g., operations of portion 320). This determination may correspond generally to operations of process 100 and/or may be performed in response to instructions from software applications of the electronic device 10 indicating that it is suitable to operate the electronic device 10 in a lower power mode than the "on" operational mode (e.g., represented by visualization 236). In response to determining to enter the flip-book mode, the application processor 52 may prepare the flip-book (e.g., operations of block 322) simultaneous to operations of the display pipeline controller 262 instructing the display pipeline 38 to process and the electronic display 12 to present the image frames actively rendered by the application processor 52 (e.g., operations of block 328).

During or after preparation of the flipbook by the application processor 52 (e.g., operations of block 322), the display pipeline controller 262 may determine that conditions have been met to enter the flipbook mode (e.g., determinations of process 294 performed with operations of block 330). When presenting pre-rendered image frames during the flipbook mode, the display pipeline controller 262 and/or the system controller 44 may use timers to manage when to return some power to image processing circuitry 252 to prepare for presentation of a next pre-rendered image frame. In response to determining the flip-book mode may be entered, the display pipeline controller 262 and/or the system controller 44 may start a timer (e.g., operations of block 332) and then, once the image processing circuitry 252 is idle after completing any ongoing operations for presenting an actively rendered image frame, may indicate to the system controller 44 that the image processing circuitry 252 is idle (e.g., block 334).

Once the image processing circuitry 252 is idle, the system controller 44 may operate the electronic device 10 in the "low power" operational mode (e.g., operations of block 336). This transition to the "low power" operational mode may involve powering off the application processor 52 (e.g., operations of block 326) and/or adjusting operation of the PMIC 256 to reduce a power output of the PMIC 256 (e.g., operations of block 338). For example, adjustment to operation of the PMIC 256 may involve changing power rails used to power the image processing circuitry from the PMIC 256 to a display power supply 258 of the electronic display 12.

The electronic device 10 may remain in the "low power" operational mode until the time set at block 332 expires (or a suitable amount of time is determined by a different method to have passed). When the timer expires (e.g., operations of block 340), the system controller 44 may increase an amount of power supplied to the image processing circuitry 252 to operate the image processing circuitry 252 in the "medium power" operational mode to enable processing of the next pre-rendered image frame (e.g., operations of block 342 and block 344). When processing of the image frame (or portion of the image frame) is completed, the display pipeline controller 262 may instruct the display pipeline 38 to transmit the processed image data to the electronic display 12 for presentation (e.g., operations of block 346). When the instruction is complete and when the image processing circuitry 252 is idle, the display pipeline controller 262 may indicate the idle state to the system controller 44 (e.g., operations of block 348). The next timer may be started by the display pipeline controller 262, an always-on component, and/or the system controller 44 (e.g., operations of block 350) to track a current display duration of the processed image data transmitted at block 346. At the start of the next timer 341, the electronic device 10 may be operated to present always-on display (AOD) frames (e.g., "Displaying AOD Frames," where "AOD" refers to a display intended to be perceived as an always-on display and where "AOD frame" refer to image frames to facilitate that perception).

These operations described above may be performed in parallel to operations associated with switching a power supply of the display panel 251 of FIG. 12. However, although parallel and generally independent, the switching of the power supply of the display panel 251 of FIG. 12 may reference information of the flip-book (e.g., presentation times as indicative of expected refresh rates, image data as indicative of expected display brightness values) and/or may be performed in response to similar interrupt conditions as the flip-book (e.g., return supply power to PMIC 256 in response to active rendering of image frames). Generally, the processing and presentation of the flip-book may continue until a condition is present to cause a change or replacement of the flip-book being presented with another flip-book (as shown generally in FIG. 16), until a condition is present to cause to exit the flip-book mode to present actively rendered image frames and/or to generate additional flip-books (as shown generally in FIG. 17), or the like.

Figure 16:
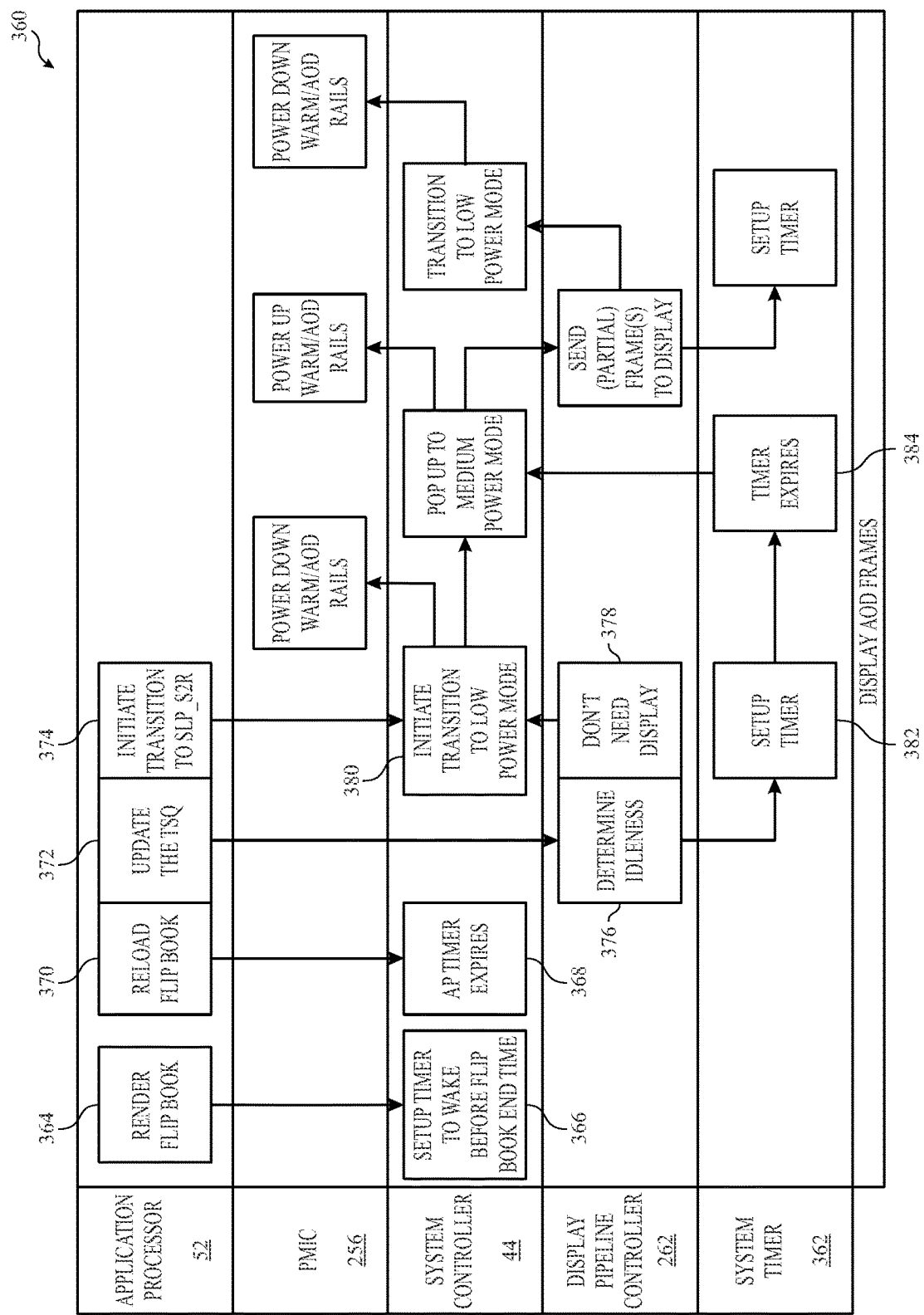
FIG. 16 is a diagrammatic representation of an example operational flow of the electronic device of FIG. 1 operating the display pipeline of FIG. 6 and/or FIG. 12 to replace a flip-book presented while in the flip-book mode, in accordance with an embodiment.

To elaborate, FIG. 16 is a flow diagram 360 visualizing operations of the application processor 52, the PMIC 256, the system controller 44, the display pipeline controller 262, and a system timer 362 (e.g., managed by the system controller 44 or an always-on component that remains active in a lower power mode, even while the system controller 44 is off) while operated to replace a flip-book being presented while in the flip-book operational mode (e.g., "Displaying AOD Frames"). Operations of the application processor 52 for rendering the flip-book at block 364 may involve the application processor 52 generating a next flip-book before an end of a current flip-book (e.g., flip-book prepared at block 322 of FIG. 15 and initially used to display the AOD frames in FIG. 15).

Indeed, FIG. 16 shows the operational transition between the two flip-books. The system controller 44 may power on the application processor 52 before the operations of block 364 to prepare the application processor 52 to render (e.g., generate) the next flip-book. In some cases, the application processor 52 may instruct the system controller 44 to power on the application processor 52 a defined number of frames before a last frame of the flip-book. In some cases, the application processor 52 may generate two flip-books, or more, and provide instructions to the system controller 44 to return power to it a defined number of frames before a last frame of the flip-book. The application processor 52 may, at block 366, set a time to wake it up (e.g., by transmitting an interrupt signal or a control signal to return power to the application processor 52) before reducing power/powering off after rendering the flip-book at block 364. When the timer expires, at block 368, the application processor 52 reloads the flip-book at 370 for access by the display pipeline 38. Loading or reloading the flip-book at block 370 may include, at block 372, updating a time stamp queue (e.g., time stamp queue 72) of the electronic device 10 to incorporate entries (e.g., entry 156) of queued frames of the flip-book loaded or reloaded at block 370.

Once the time stamp queue is updated, the application processor 52 may signal to the display pipeline controller 262 and, at block 374, initiate its transition to a reduced power mode or power-off mode via signal to system controller 44. In response to the signal from the application processor 52 indicating the completion of operations of block 372, the display pipeline controller 262 may, at block 376, determine idleness of the display pipeline 38 (e.g., whether the display pipeline 38 is idle) and whether, at block 376, the display pipeline 38 is to be used to present next image data. When not used for display, the display pipeline controller 262 may, at block 378, signal to the system controller 44 that the system controller 44 may enter a reduced power or power-off state. The system controller 44 may, at block 380, initiate its transition to a lower power mode in response to the signal from the application processor 52 (e.g., at block 374) and to the signal from the display pipeline controller 262 (e.g., at block 378). To do so, the system controller 44 or the always on component that remains active in a lower power mode, even while the system controller 44 is off may, at block 382, instruct the system timer 362 to setup a timer. When the timer expires, at block 384, an interrupt signal may be transmitted to cause a return to power of the system controller 44, such that a next image frame of the next flip-book may be processed. Remaining blocks may operate similarly to operations of FIG. 15 and/or to flip-book presentation operations described earlier.

Figure 17:
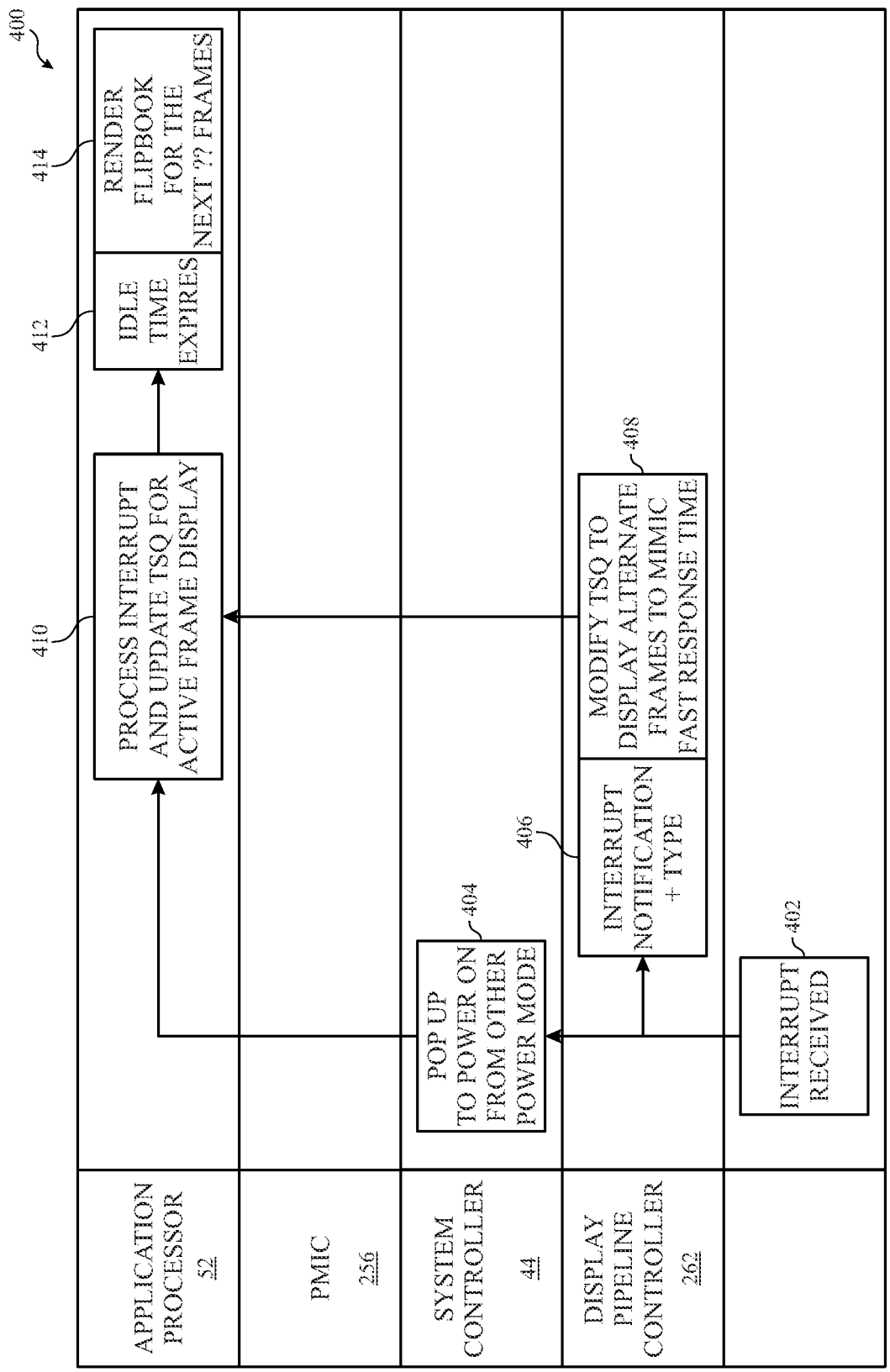
FIG. 17 is a diagrammatic representation of an example operational flow of the electronic device of FIG. 1 operating the display pipeline of FIG. 6 and/or FIG. 12 to exit the flip-book mode, in accordance with an embodiment.

FIG. 17 is a flow diagram 400 visualizing operations of the application processor 52, the PMIC 256, the system controller 44, and the display pipeline controller 262 while operated to exit the flip-book mode operational mode, such as to generate an additional flip-book and/or to resume active rendering of image frame. The components may exit the flip-book operational mode (e.g., "Exit from AOD Frame and prepare for re-entry") in response to a trigger, such as a timer expiring causing generation of an interrupt signal, receiving an input via the electronic display 12 causing generating of an interrupt signal (e.g., generated and/or received at block 402), or the like, where the input may be an audio signal, a pressure-related indicated interpreted as an input, or the like. Furthermore, there may be a situation where an ambient environment deviates dramatically from that used to generate the flip-book, thus device detecting the change in environment may trigger the generation of the interrupt signal.

For example, the electronic device 10 may receive an indication of an input to the electronic display 12 (e.g., a user pressing a rendered button causing generation of the indication for interpretation by the system controller 44), and determine that the indication is a trigger to cause the electronic device 10 to return to actively processing image frames for presentation, such as a request to load an application, to make a cellular call, or the like. However, these are just a few examples of operations that may be used to trigger the transition from the flip-book mode (e.g., flipbook presentation mode) to a normal mode (e.g., normal presentation mode), and it should be understood that many operations may initiate the same transition.

When the transition is triggered (e.g., interrupt received at block 402), the system controller 44 may, at block 404, pop up or return to its power-on mode from other power mode (e.g., power-off mode, lower power mode such as low power mode or medium power mode). Furthermore, in response to the transition being triggered, the display pipeline controller 262 may identify the interrupt notification and type of the interrupt (e.g., to distinguish between an interrupt generated from a timer expiring or other interrupt used to control flip-book mode operations of the display pipeline controller 262) at block 406.

In response to determining that the interrupt is instructing an exit from the flip-book mode, the display pipeline controller 262 may, at block 408, modify the time stamp queue (e.g., TSQ, time stamp queue 72) to include alternative image frames to mimic a relatively fast response time of the electronic device 10. These frames that mimic fast response time may mask a delay in processing associated with waking up components from reduced power modes or power off modes. The alternative image frame queuing may also be performed simultaneous to changing the power supply of the display panel 251 to the PMIC 256, such as to prepare for the series of quick frame transitions associated with the alternative image frames, though this operation is not depicted in FIG. 17. At block 410, the display pipeline controller 262 and the system controller 44 may each signal to the application processor 52 to proceed with its operations, and thus the application processor 52 may, at block 410, process the interrupt and update the time stamp queue to present actively rendered image frames. While the application processor 52 is rendering the image frames, the display pipeline 38 and the electronic display 12 may coordinate presentation of the alternative image frames such that no interruption of service (e.g., delay to presentation of content) is perceivable by a user of the electronic device 10. At block 412, a timer set by the application processor 52 or an always-on component that remains active in a lower power mode, even while the system controller 44 is off after updating the time stamp queue expires and the application processor 52 proceeds, at block 414, to render a flip-book in anticipation of entering a new flip-book mode while actively rendering frames for ongoing image presentations. Operations subsequent to block 414 may continue similar to operations of FIG. 15 associated with determining when to enter again to the flip-book mode and entry into the flip-book mode. Operations subsequent to block 414 may, additionally or alternatively, continue with active image rendering where the application processor 52 generates a next image frame and the display pipeline controller 262 operates the display pipeline 38 to process image data for the next image frame prior to transmission to the electronic display 12.

It is noted that sometimes the application processor 52 is powered-on in response to the trigger being received. Sometimes the trigger is generated in response to a currently displayed flip-book reaching a last queued entry 156, such that newly rendered image frames or a new flip-book is to be displayed. Sometimes, however, the trigger interrupts presentation of the currently display flip-book prior to approaching the last queued entry 156, causing remaining entries 156 to expire or become outdated in view of the trigger to resume active rendering of image data. The display pipeline 38 may flush expired time stamp queue 72 entries 156 in response to the application processor 52 being powered-on actively rendering images for display. That is, the display pipeline 38 may discard irrelevant entries 156 and/or image data such that the previously queued images are not displayed and instead the new actively rendered images are displayed.

Thus, the technical effects of the present disclosure include reducing overall power consumption of an electronic device, for example, by powering a display panel from different power rails at different times thereby improving power management the electronic device. These systems and methods may be used to selectively power-gate, power on, and/or power off a display pipeline to lower an overall amount of power consumed by the electronic device. A flip-book mode may enable a controller to operate the display pipeline in a reduced-power state (e.g., powered-off, power-gated) while idle between displaying of flip-book image frames. While in the flip-book mode, an application processor (e.g., image source) may be powered-off, permitting further power consumption reductions. The application processor may be powered-off substantially simultaneous to the display pipeline being operated in and out of a "medium power" operational mode to further balance processing and power-reductions that reduce processing power when the image processing circuitry is idle to improve power consumption. The display panel may be operated into a lower power consumption mode while the electronic device is in a flip-book mode to further reduce power consumed by the electronic device when image content of an image frame to be presented so permits. Content-based panel power supply selection may change which power supply is used to power a display panel in response to colors of image data to be presented, a display brightness value to be used when presenting the image data, a refresh rate to be used when presenting a series of image frames, or the like. In this way, the electronic device may increase power supplied to its display panel in anticipation of the display panel consuming a relatively high amount of power and/or may decrease power supplied to the display panel in anticipation of the display panel consuming a relatively low amount of power.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
    a power management integrated circuit;
    a display power supply that bypasses the power management integrated circuit;
    a first power rail coupled to the power management integrated circuit and a switch operable based on an indication from an image source, from a controller of a display pipeline, or both, to proceed with operating in a medium power operational mode;
    a second power rail coupled to the display power supply and the switch; and
    a display driver integrated circuit of a display panel coupled to the switch, wherein the display driver integrated circuit is configured to:
        at a first time, receive power from the power management integrated circuit via the first power rail; and
        at a second time, receive power from the display power supply via the second power rail in the medium power operational mode, wherein the image source is powered down based on the indication.

2. The electronic device of claim 1, comprising a system controller configured to:
    transmit, based on content of a first image frame satisfying a first condition, a first control signal to the switch at the first time to operate the switch to couple the display panel to the first power rail; and
    transmit, based on content of a second image frame satisfying a second condition, a second control signal to the switch at the second time to operate the switch to couple the display panel to the second power rail.

3. The electronic device of claim 2, comprising image processing circuitry, wherein the system controller is configured to determine which of the first control signal and the second control signal to transmit based on the indication.

4. The electronic device of claim 2, comprising image processing circuitry, wherein the system controller is configured to transmit the second control signal based on the image processing circuitry being idle after processing an image frame.

5. The electronic device of claim 1, comprising a system power source coupled to the power management integrated circuit and to the display power supply.

6. The electronic device of claim 1, wherein the display power supply is configured to consume an amount of power less than the power management integrated circuit.

7. The electronic device of claim 1, wherein the power management integrated circuit is directly coupled to the switch.

8. The electronic device of claim 7, wherein the switch is directly coupled to the display panel.

9. The electronic device of claim 1, comprising a system controller configured to operate the switch after the first time to cause the display panel to receive power from the display power supply based on a condition.

10. The electronic device of claim 9, wherein the condition corresponds to:
    a refresh rate of the display panel;
    incoming image data;
    an indication of the incoming image data corresponding to a partial frame update;
    an indication of a brightness value associated with the incoming image data; or
    any combination thereof.

11. A method comprising:
receiving an indication from an image source configured to generate an image frame for presentation via a display, from a controller of a display pipeline, or both, to proceed with operating the display pipeline in a medium power operational mode, wherein the display pipeline is coupled to the display;
coupling the display to a power source of the display that bypasses a power management integrated circuit based on the indication;
decoupling the display from a first power rail coupled to the power management integrated circuit; and
powering down the image source based on the indication and at an at least partially overlapping time as the display being decoupled from the power management integrated circuit.

12. The method of claim 11, comprising:
coupling the display to the first power rail; and
decoupling the display from the power source after coupling the display to the first power rail.

13. The method of claim 11, comprising transmitting a control signal to a switch to decouple the display to the power source and to couple the display to the power management integrated circuit.

14. The method of claim 11, comprising:
in response to coupling the display to the power source, transmitting a first control signal configured to change an operational mode of the power management integrated circuit while the display is coupled to the power source;
determining to decouple the display from the power source; and
in response to determining to decouple the display from the power source, transmitting a second control signal configured to change the operational mode of the power management integrated circuit.

15. The method of claim 11, wherein the display pipeline is separate from a display driver, and wherein the medium power operational mode is between a maximum power operational mode and a minimum power operational mode.

16. A system, comprising:
a power management integrated circuit;
a display power supply configured to bypass the power management integrated circuit;
a system controller configured to operate a switch to couple the power management integrated circuit or the display power supply to an output of the switch based on an indication, from a display pipeline, that content of an image frame is expected to consume an amount of power that crosses a threshold; and
a display panel coupled to the output of the switch, wherein the display panel is configured to:
by a first time, receive power from the power management integrated circuit as opposed to the display power supply based on the system controller receiving a first indication from the display pipeline; and
by a second time, receive power from the display power supply as opposed to the power management integrated circuit based on the system controller receiving a second indication from the display pipeline.

17. The system of claim 16 comprising:
a first power rail coupled to the power management integrated circuit and the switch; and
a second power rail coupled to the display power supply and the switch, wherein the display power supply bypasses the power management integrated circuit.

18. The system of claim 17, wherein the system controller is configured to;
transmit a first control signal to the switch at the first time to operate the switch to couple the display panel to the first power rail;
determine that the content of the image frame is expected to consume the amount of power that crosses the threshold; and
transmit a second control signal to the switch at the second time to operate the switch to couple the display panel to the second power rail based on determining that the content is expected to consume the amount of power that crosses the threshold.

19. The system of claim 18, wherein the first control signal is configured to operate the switch to decouple the display panel to the display power supply and to couple the display panel to the power management integrated circuit.

20. The system of claim 16, wherein the system controller is configured to decouple the power management integrated circuit to the display panel based on:
a refresh rate of the display panel;
incoming image data;
an indication of the incoming image data corresponding to a partial frame update;
an indication of a brightness value associated with the incoming image data; or
sensing data; or
any combination thereof.

* * * * *